United States Patent
Kim et al.

(10) Patent No.: US 12,526,837 B2
(45) Date of Patent: Jan. 13, 2026

(54) METHOD AND APPARATUS FOR REPORTING INFORMATION RELATED TO SYSTEM INFORMATION REQUEST IN NEXT-GENERATION MOBILE COMMUNICATION SYSTEM

(71) Applicant: Samsung Electronics Co., Ltd., Suwon-si (KR)

(72) Inventors: Sangbum Kim, Suwon-si (KR); Anil Agiwal, Suwon-si (KR); Himke Van Der Velde, Staines (GB); Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 17/708,572

(22) Filed: Mar. 30, 2022

(65) Prior Publication Data
US 2022/0330323 A1    Oct. 13, 2022

(30) Foreign Application Priority Data

Mar. 30, 2021 (KR) .................. 10-2021-0041488
Jun. 18, 2021 (KR) .................. 10-2021-0079609

(51) Int. Cl.
*H04W 74/00* (2009.01)
*H04W 74/0833* (2024.01)
*H04W 74/0838* (2024.01)

(52) U.S. Cl.
CPC ..... *H04W 74/004* (2013.01); *H04W 74/0833* (2013.01); *H04W 74/0838* (2024.01)

(58) Field of Classification Search
CPC .......... H04W 74/004; H04W 74/0833; H04W 74/08; H04W 48/12; H04W 48/14
See application file for complete search history.

(56) References Cited

U.S. PATENT DOCUMENTS

| | | |
|---|---|---|
| 2019/0141746 A1 | 5/2019 | Hong et al. |
| 2019/0306784 A1 * | 10/2019 | Chen ................. H04W 76/15 |
| 2021/0084682 A1 * | 3/2021 | Kimba Dit Adamou ................. H04W 76/27 |
| 2021/0168851 A1 | 6/2021 | Kim et al. |
| 2021/0274559 A1 | 9/2021 | Hwang et al. |
| 2022/0022267 A1 * | 1/2022 | Shi ............ H04W 74/0833 |

FOREIGN PATENT DOCUMENTS

| | | | |
|---|---|---|---|
| KR | 10-2019-0085422 A | 7/2019 | |
| WO | 2020-005043 A1 | 1/2020 | |
| WO | WO-2020134726 A1 * | 7/2020 | ........... H04W 24/02 |

(Continued)

OTHER PUBLICATIONS

CMCC, 'Report of [AT113-e][845] [NR/R17 SON/MDT] Logged MDT part II (CMCC)', R2-2102142, 3GPP TSG-RAN WG2 Meeting #113 electronic, Feb. 10, 2021.

(Continued)

*Primary Examiner* — Huy D Vu
*Assistant Examiner* — Latha Chakravarthy
(74) *Attorney, Agent, or Firm* — Jefferson IP Law, LLP

(57) ABSTRACT

The disclosure relates to a 5G or 6G communication system for supporting a higher data transmission rate. A method and a device for reporting system information request-related information in a next-generation mobile communication system are provided.

12 Claims, 27 Drawing Sheets

(56) References Cited

FOREIGN PATENT DOCUMENTS

| WO | WO-2020186403 A1 | * | 9/2020 | |
|----|------------------|---|--------|---|
| WO | WO-2020199942 A1 | * | 10/2020 | ........... H04B 7/0695 |
| WO | 2020/234507 A1 | | 11/2020 | |

OTHER PUBLICATIONS

CMCC, 'MDT enhancement for on-demand Si', R2-2101642, 3GPP TSG-RAN WG2 Meeting #113 electronic, Jan. 15, 2021.
Samsung, 'Progressing Logged MDT for R17 concerning MR-DC, IRAT, IDC and on demand Si', R2-2101945, 3GPP TSG-RAN WG2#113-e Meeting, Online, Jan. 15, 2021.
Huawei (Summary Rapporteur), 'Summary on 8.13.3 MDT', R2-2102250, 3GPP TSG-RAN WG2 Meeting #113 electronic, Online, Feb. 10, 2021.
International Search Report and Written Opinion dated Jun. 17, 2022, issued in International Patent Application No. PCT/KR2022/004531.
Extended European Search Report dated Dec. 13, 2023, issued in European Patent Application No. 22781622.0.
European Office Action dated Oct. 15, 2025, issued in European Patent Application No. 22781622.0.

\* cited by examiner

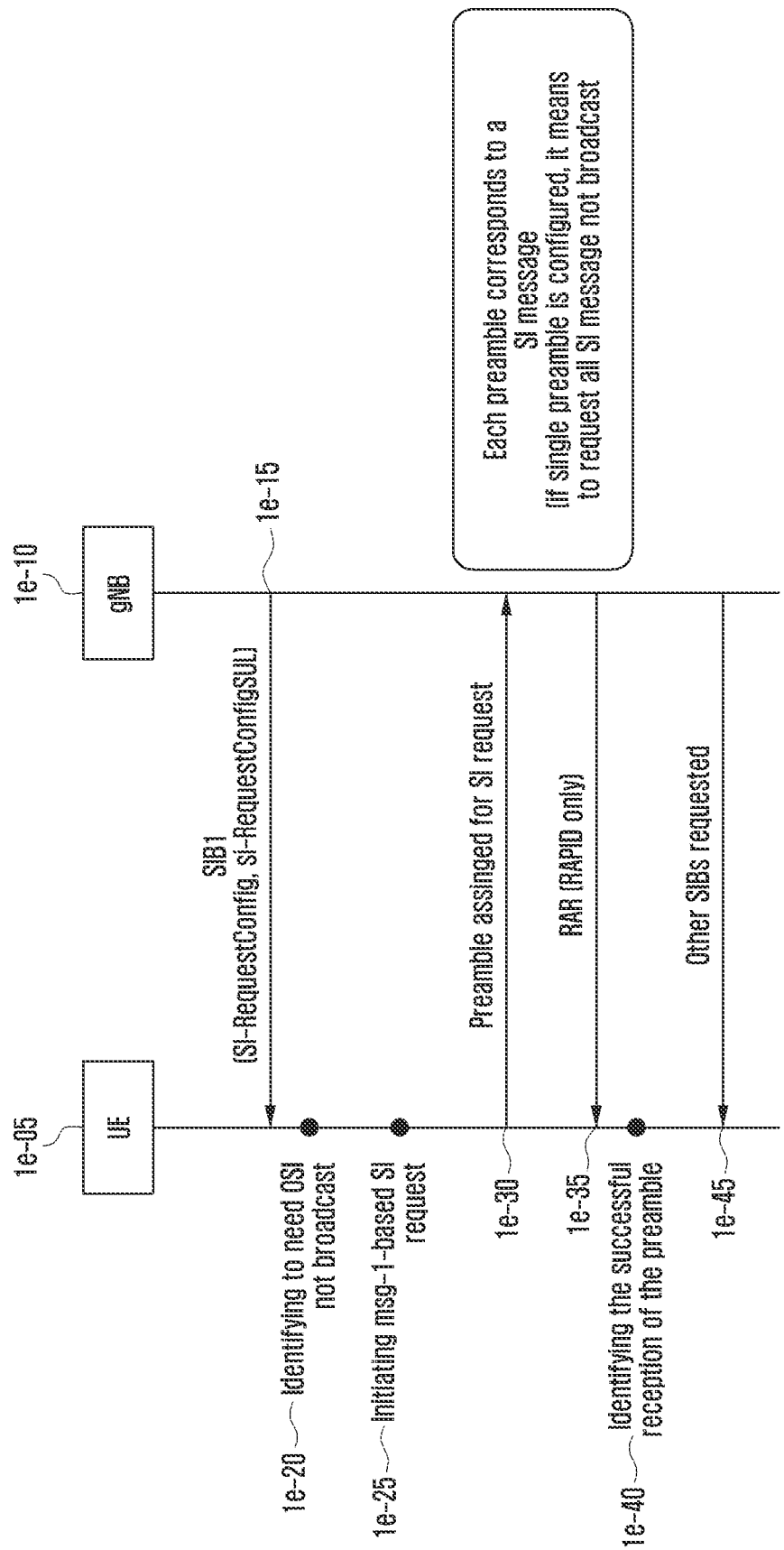

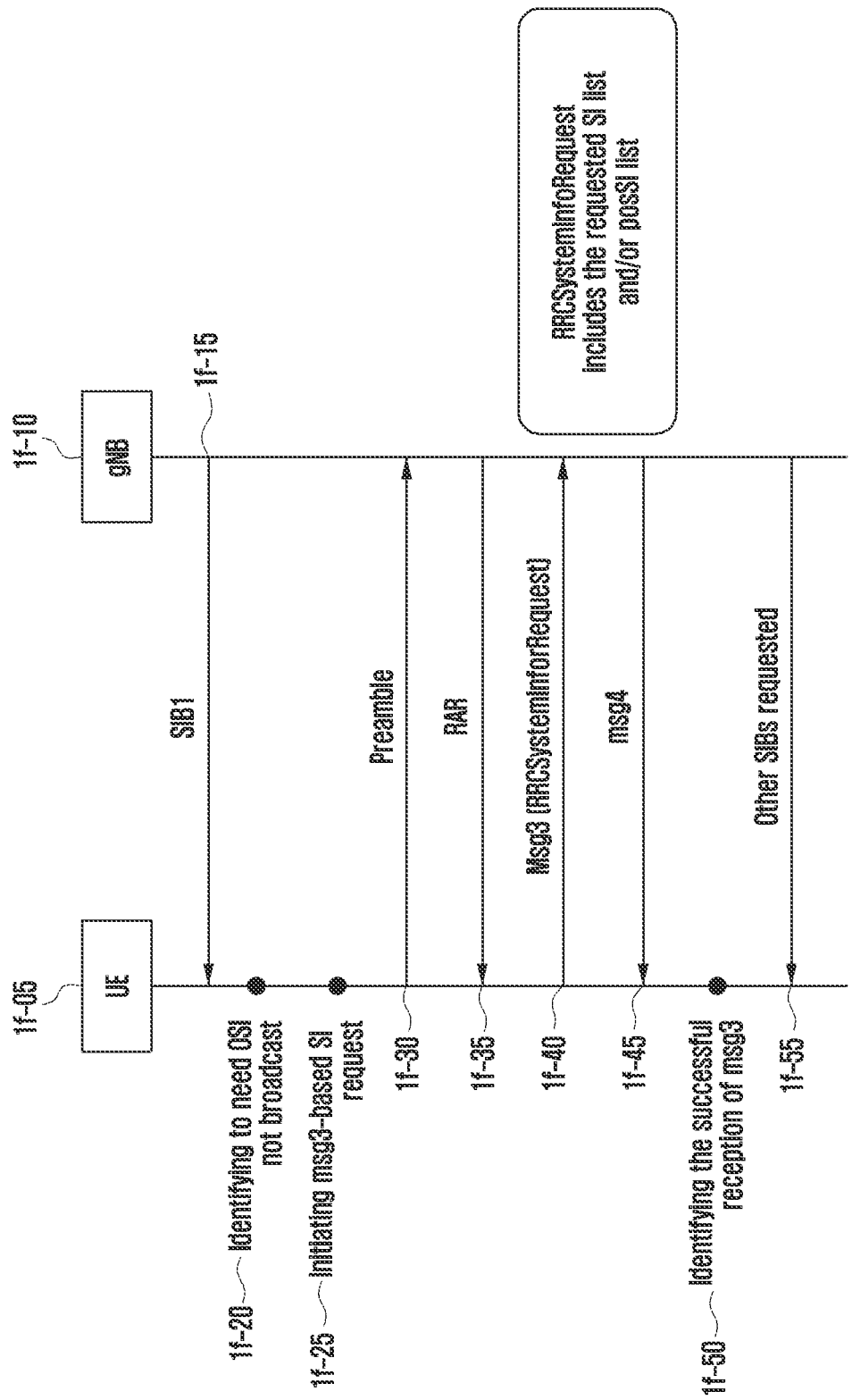

FIG. 1L
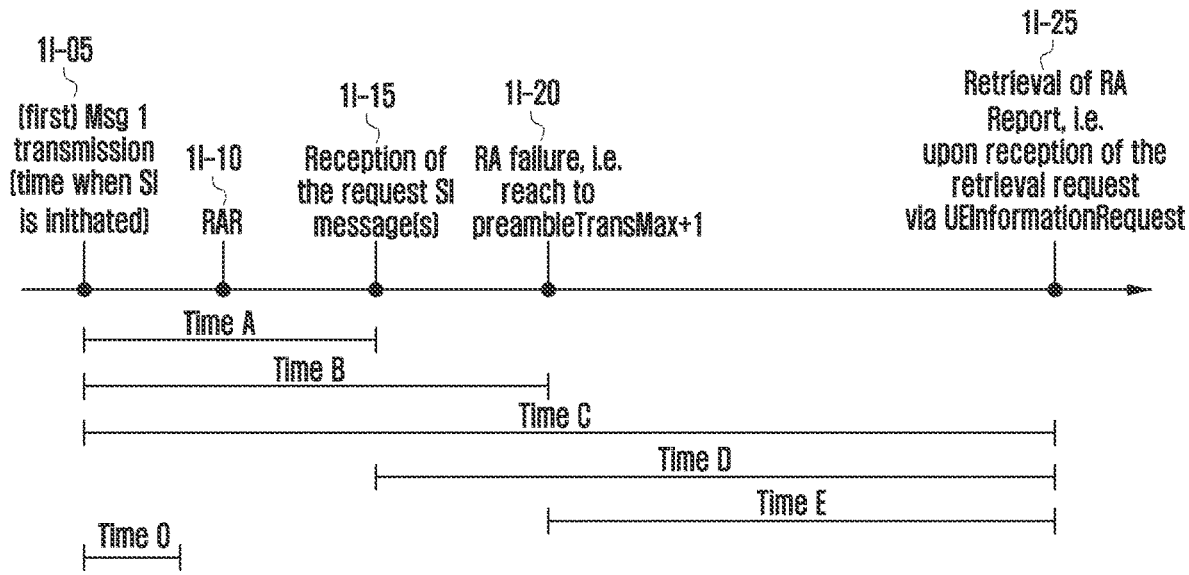
(a) new time information for msg1-base SI request
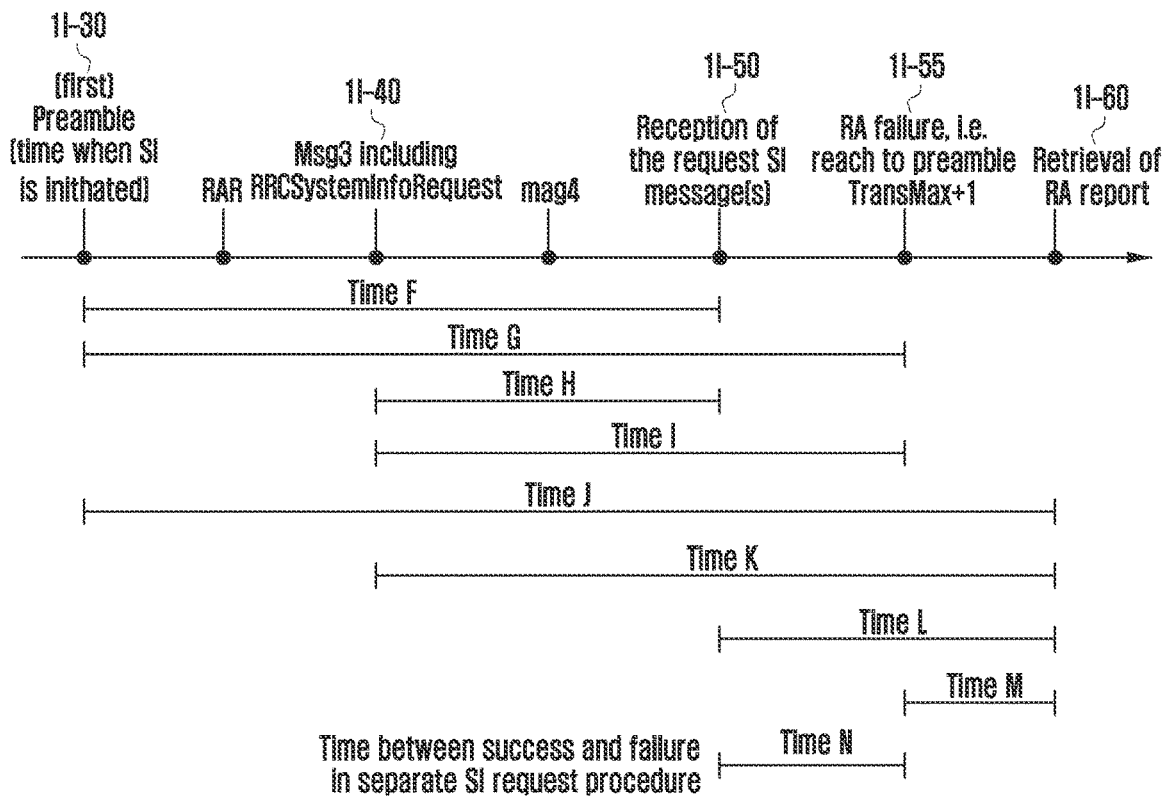
(b) new time information for msg3-base SI request

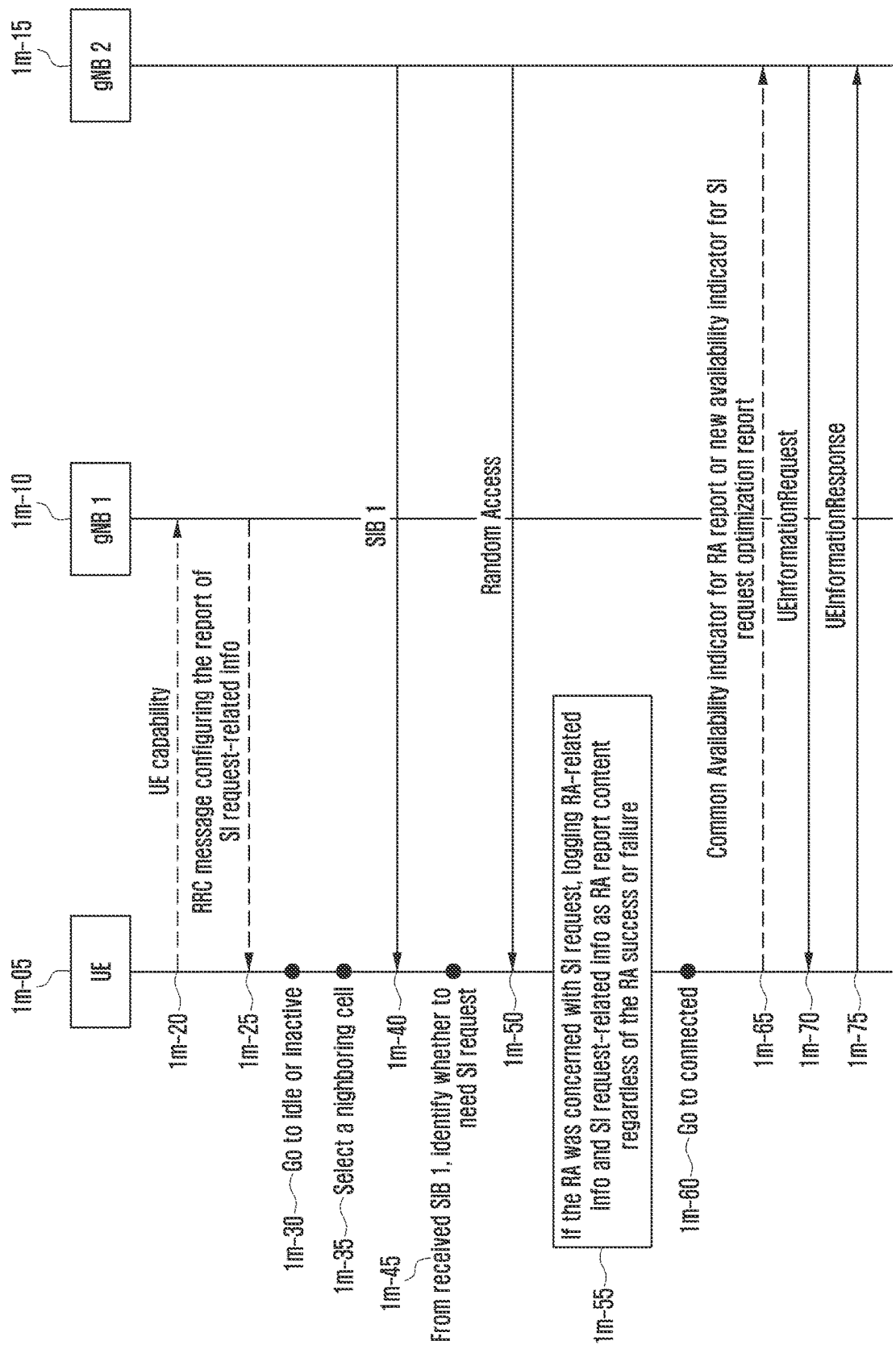

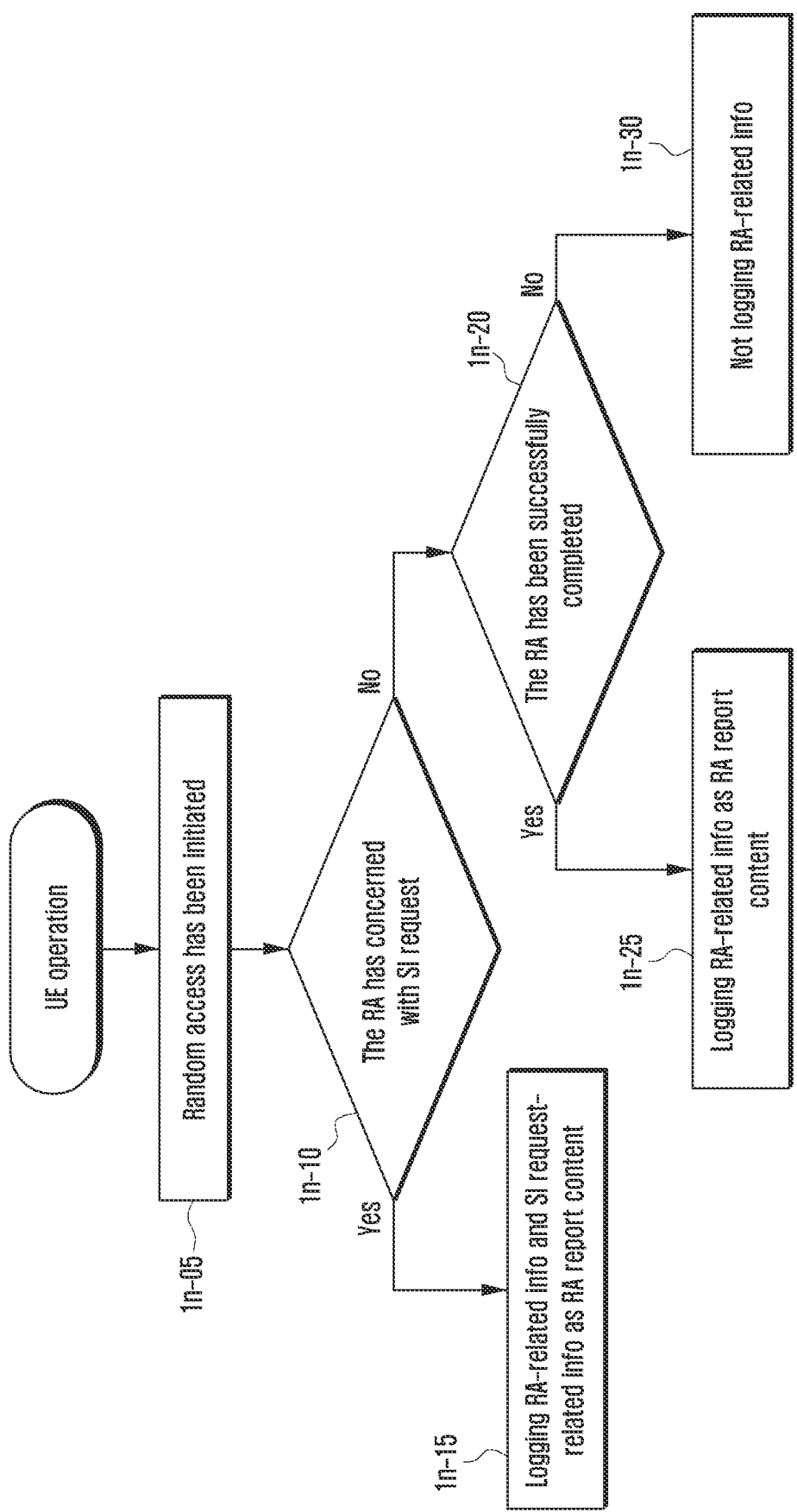

METHOD AND APPARATUS FOR REPORTING INFORMATION RELATED TO SYSTEM INFORMATION REQUEST IN NEXT-GENERATION MOBILE COMMUNICATION SYSTEM

CROSS-REFERENCE TO RELATED APPLICATION(S)

This application is based on and claims priority under 35 U.S.C. § 119(a) of a Korean patent application number 10-2021-0041488, filed on Mar. 30, 2021, in the Korean Intellectual Property Office, and of a Korean patent application number 10-2021-0079609, filed on Jun. 18, 2021, in the Korean Intellectual Property Office, the disclosure of each of which is incorporated by reference in its entirety.

BACKGROUND

1. Field

The disclosure relates to operations of a terminal and a base station in a mobile communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

A random access (RA) report may need to be improved such that a random access which has been perform to request system information (SI) but has failed can also be considered.

Aspects of the disclosure are to address at least the above-mentioned problems and/or disadvantages and to provide at least the advantages described below. Accordingly, an aspect of the disclosure is to provide a method and an apparatus for reporting information related to a system information request in a next-generation mobile communication system.

Additional aspects will be set forth in part in the description which follows and, in part, will be apparent from the description, or may be learned by practice of the presented embodiments.

In accordance with an aspect of the disclosure, a method by a terminal in a wireless communication system is provided. The method includes transmitting, to a base station, a message for requesting system information (SI) on a random access (RA) procedure, identifying whether the RA procedure is succeeded or failed, storing information for the RA procedure in case that the RA procedure is failed, generating a RA report including the stored information for the RA procedure and transmitting, to the base station, the RA report.

In accordance with another aspect of the disclosure, a terminal in a wireless communication system is provided. The terminal includes a transceiver and at least one processor is configured to transmit, to a base station via the transceiver, a message for requesting system information (SI) on a random access (RA) procedure, identify whether the RA procedure is succeeded or failed, store information for the RA procedure in case that the RA procedure is failed, generate a RA report including the stored information for the RA procedure, and transmit, to the base station via the transceiver, the RA report.

In accordance with another aspect of the disclosure, a method and an apparatus for reporting information related to a system information request in a next-generation mobile communication system are provided.

Other aspects, advantage, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1E illustrates an msg1-based SI request process according to an embodiment of the disclosure;

FIG. 1F illustrates an msg3-based SI request process according to an embodiment of the disclosure;

FIG. 1L illustrates time information to include SI request-related information according to an embodiment of the disclosure;

FIG. 1M illustrates a method for storing SI request-related information in a single random access report and reporting the same according to an embodiment of the disclosure;

FIG. 1N illustrates a flowchart of a terminal operation of storing SI request-related information in a single random access report according to an embodiment of the disclosure;

FIG. 1O illustrates a flowchart of a base station operation of storing SI request-related information in a single random access report according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of the disclosure, a detailed description of known functions or configurations incorporated herein will be omitted when it is determined that the description may make the subject matter of the disclosure unnecessarily unclear. For the convenience of description, the disclosure will be described using terms and names defined in the 3rd generation partnership project long term evolution (3GPP LTE) standards. However, the disclosure is not limited by these terms and names, and may be applied in the same way to systems that conform other standards. Hereinafter, embodiments of the disclosure will be described with reference to the accompanying drawings.

Figure 1A:
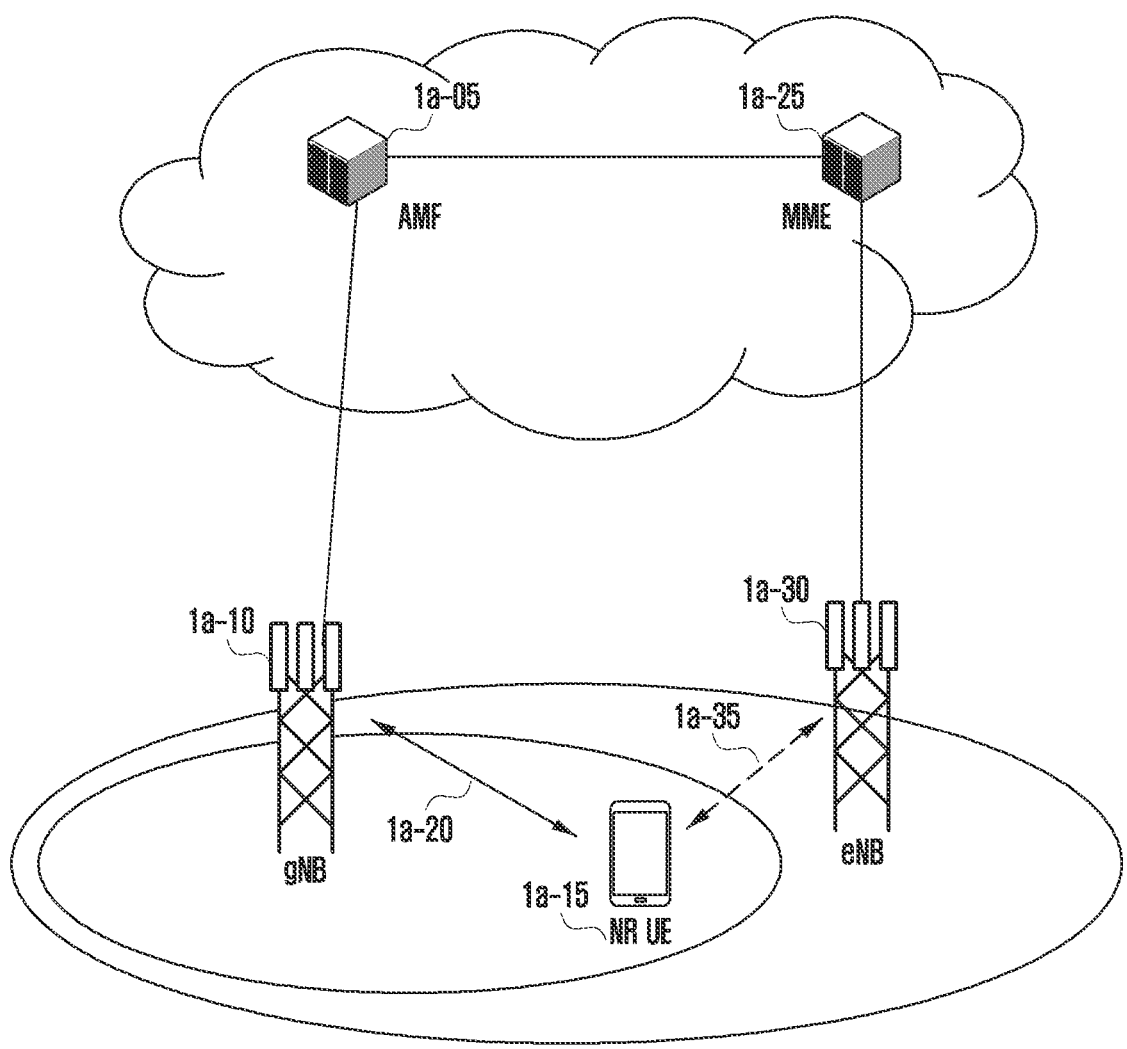
FIG. 1A illustrates a structure of a next-generation mobile communication system according to an embodiment of the disclosure.

FIG. 1A illustrates a structure of a next-generation mobile communication system according to an embodiment of the disclosure.

Referring to FIG. 1A, a radio access network (RAN) of a next-generation mobile communication system (new radio, NR) may include a next-generation base station (new radio node B, hereinafter, referred to as a gNB) 1a-10 and a new radio core network access and mobility management function (AMF) 1a-05. A new radio user equipment (hereinafter, referred to as an NR UE or a terminal) 1a-15 may access an external network via the gNB 1a-10 and the AMF 1a-05.

Referring to FIG. 1A, the gNB may correspond to an evolved node B (eNB) of an existing LTE system. The gNB may be connected to the NR UE via a radio channel, and may provide a service superior to that of the existing Node B (1a-20). In the next-generation mobile communication system, since all user traffics may be serviced via a shared channel, a device for collecting and scheduling state information such as a buffer state, an available transmission power state, and a channel state of UEs may be required, and the gNB 1a-10 may serve as such a device. One gNB may generally control multiple cells. In order to realize ultra-high-speed data transmission compared to the existing LTE system, the next-generation mobile communication system may have a bandwidth equal to or greater than the existing maximum bandwidth, may employ, as a radio access technology, orthogonal frequency division multiplexing (OFDM), and may further employ a beamforming technology in addition thereto. In addition, an adaptive modulation and coding (AMC) scheme for determining a modulation scheme and a channel coding rate according to a channel state of a terminal may be applied. The AMF 1a-05 may perform functions such as mobility support, bearer configuration, and quality of service (QoS) configuration. The AMF may be a device responsible for various control functions as well as a mobility management function for a terminal, and may be connected to multiple base stations. In addition, the next-generation mobile communication system may interwork with the existing LTE system, and the AMF may be connected to an MME 1a-25 via a network interface. The MME 1a-25 may be connected to an eNB 1a-30 which is an existing base station. A terminal supporting LTE-NR dual connectivity may transmit or receive data while maintaining a connection to not only the gNB but also the eNB (1a-35).

The next-generation mobile communication system has three radio access states (radio resource control (RRC) states). A connected mode (RRC_CONNECTED) is a radio access state in which a terminal can transmit or receive data. An idle mode (RRC_IDLE) is a radio access state in which a terminal monitors whether paging is transmitted to itself. The two modes are radio access states which are also applied to the existing LTE system, and the detailed technology is the same as that of the existing LTE system. In the next-generation mobile communication system, an inactive (RRC_INACTIVE) radio access state may be newly defined. In the radio access state, a UE context may be maintained in a base station and a terminal, and RAN-based paging may be supported. The characteristics of the new radio access state may be listed as follows.

Cell re-selection mobility;
Core network (CN)—NR RAN connection (both control/user (C/U)-planes) has been established for UE;
The UE AS context is stored in at least one gNB and the UE;
Paging is initiated by NR RAN;
RAN-based notification area is managed by NR RAN;
NR RAN knows the RAN-based notification area which the UE belongs to;

The new inactive (RRC_INACTIVE) radio access state may transition to the connected mode or the idle mode by using a specific procedure. The INACTIVE mode may be switched to the connected mode according to a resume process, and the connected mode may be switched to the INACTIVE mode by using a release procedure including suspend configuration information. The procedure may allow one or more RRC messages to be transmitted or received between a terminal and a base station, and may include one or more operations. In addition, via the release procedure after the resume process, the INACTIVE mode can be switched to the idle mode. Switching between the connected mode and the idle mode may follow the existing LTE technology. For example, via an establishment procedure or the release procedure, switching between the modes may be made.

Figure 1B:
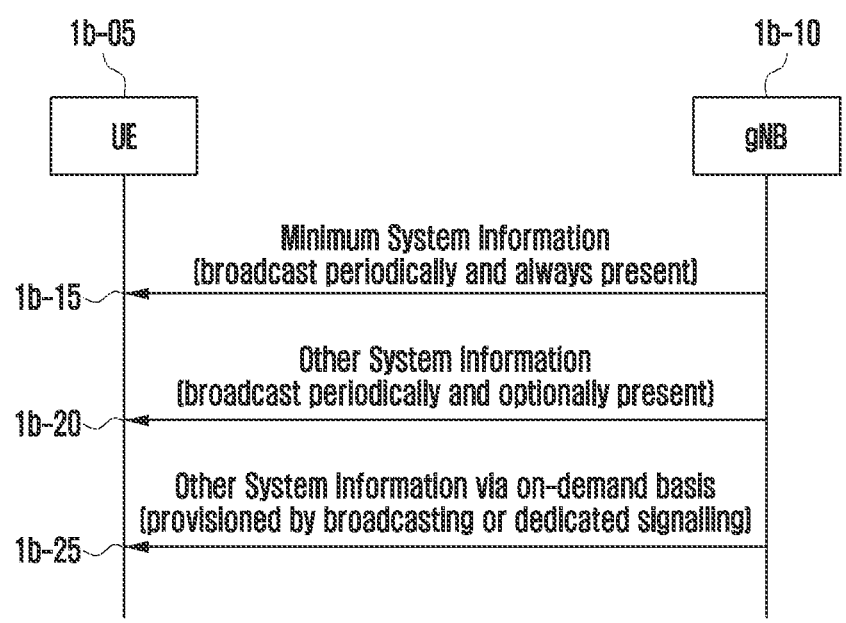
FIG. 1B illustrates a method for providing system information in a next-generation mobile communication system according to an embodiment of the disclosure.

FIG. 1B illustrates a method for providing system information in a next-generation mobile communication system according to an embodiment of the disclosure.

In the next-generation mobile communication system, system information broadcasted to UE 1b-05 by a base station 1b-10 is largely divided into minimum system information (SI) and other system information. The minimum SI may always be periodically broadcasted (1b-15), and may include configuration information required for initial access and SI scheduling information required to receive other SI broadcasted periodically or based on a request. Master information block (MIB) and system information block 1 (SIB1) may belong to the minimum SI. Fundamentally, the other SI may include all configuration information not included in the minimum SI. The other SI may be broadcasted periodically (1b-20) or based on a terminal request, or may be provided to a terminal by using dedicated signaling (1b-25). When the terminal requests and receives the other SI, before performing the request, the terminal is required to identify whether the other SI is valid in the cell or is currently being broadcasted (by a request of another terminal). The identification is possible via specific information provided by the minimum SI. The terminal which is in an idle mode (RRC_IDLE) or an INACTIVE mode (RRC_INACTIVE) may request other SI without changing the current RRC state. The terminal which is in a connected mode (RRC_CONNECTED) may request and receive other SI via dedicated RRC signaling. The other SI may be broadcasted for a predetermined period of time for every configured period. Public warning system (PWS) information may be classified as other SI and provided. Whether to broadcast the other SI or provide the other SI to a terminal via dedicated RRC signaling may depend on network implementation.

Another feature of the other SI in the next-generation mobile communication system is that SIB1 can be informed that the same information is being broadcasted in adjacent cells for each SIB. This may serve to prevent an unnecessary operation of re-acquiring the SIB having the same information when a terminal moves to an adjacent cell. The SIB1 may indicate an area-based SIB which may have the same information as that of an adjacent cell, by using an areaScope field for each SIB belonging to other SI except for the MIB and SIB1. In addition, an area identifier (ID) of a corresponding cell, systemInformationAreaID, may also be provided. After moving to an adjacent cell, in case that the area ID provided by the SIB1 broadcasted by the adjacent cell has the same value, it is not necessary to re-acquire the area-based SIB.

Figure 1C:
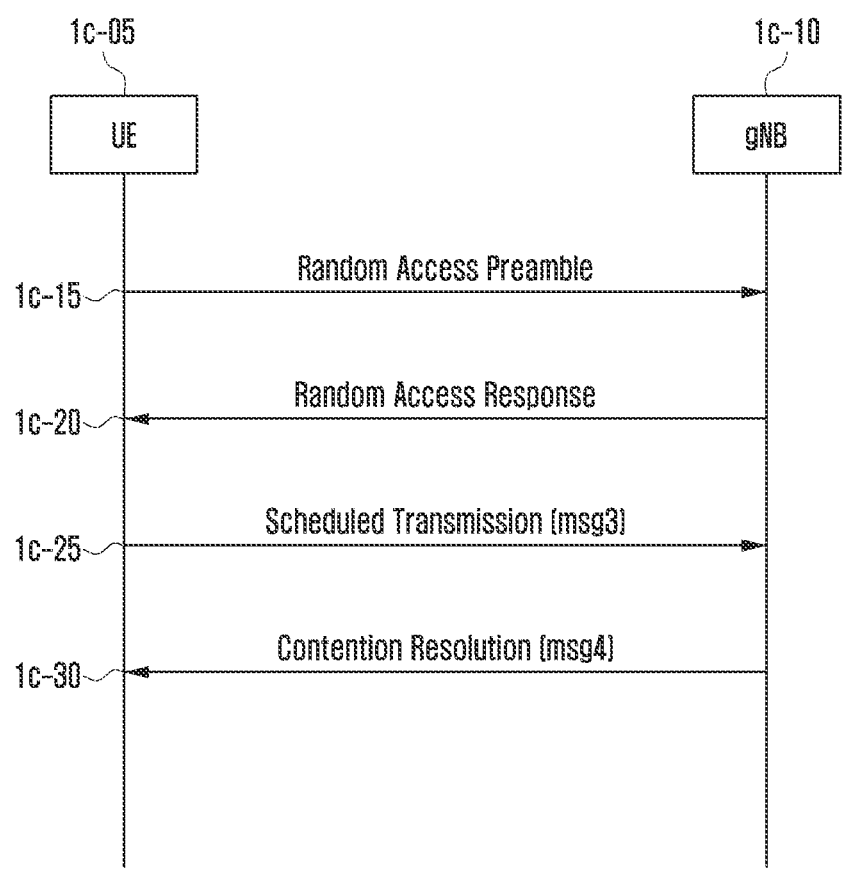
FIG. 1C illustrates a random access process in a next-generation mobile communication system according to an embodiment of the disclosure.

FIG. 1C illustrates a random access process in a next-generation mobile communication system according to an embodiment of the disclosure.

A random access may be performed when uplink (UL) synchronization is achieved or when data is transmitted via a network. In more detail, the random access may be performed when switching from an idle mode to a connected mode, when performing RRC re-establishment, when performing handover, when starting uplink data, and when starting downlink data. When a terminal 1c-05 receives a dedicated preamble from a base station 1c-10, the terminal 1c-05 may apply the preamble to transmit the preamble. Otherwise, the terminal may select one of two preamble groups and select a preamble belonging to the selected group. The groups are referred to as group A and group B. In case that a channel quality state is better than a specific threshold value and the size of msg3 is greater than a specific threshold value, the terminal may select a preamble belonging to the group A, otherwise, the terminal may select a preamble belonging to the group B. The preamble may be transmitted in an nth sub-frame (1c-15). In case that the preamble has been transmitted in the nth sub-frame, a random access response (RAR) window is started from an (n+3)th sub-frame, and whether an RAR is transmitted within a time interval of the window may be monitored (1c-20). Scheduling information of the RAR may be indicated by RA-radio network temporary identifier (RNTI) of a physical downlink control channel (PDCCH). The RA-RNTI may be derived by using a radio resource location on time and frequency axes used for transmission of the preamble. The RAR may include a timing advance command, a UL grant, and a temporary cell (C)-RNTI. In case that the RAR is successfully received in the RAR window, msg3 may be transmitted by using information on the UL grant included in the RAR (1c-25). The msg3 may include different pieces of information depending on a purpose of the random access. Table 1 below shows an example of information included in the msg3.

TABLE 1

| CASE | Message 3 Contents |
| --- | --- |
| RRC CONNECTION SETUP | Common control channel (CCCH) service data unit (SDU) |
| RRC RE-ESTABLISHMENT | CCCH SDU, buffer status report (BSR) (if grant is enough), power headroom report (PHR) (if triggered & grant is enough) |
| Handover (random preamble) | C-RNTI control element (CE), BSR, PHR, (part of) dedicated control channel (DCCH) SDU |
| Handover (dedicate preamble) | BSR, PHR, (part of) DCCH SDU |
| UL resume | C-RNTI CE, BSR, PHR, (part of) DCCH/dedicated traffic channel (DTCH) SDU |
| PDCCH order (random preamble) | C-RNTI CE, BSR, PHR, (part of) DCCH/DTCH SDU |
| PDCCH order (dedicate preamble) | BSR, PHR, (part of) DCCH/DTCH SDU |

In case that the RAR has been received in the nth sub-frame, the msg3 may be transmitted in an (n+6)th sub-frame. From the msg3, a hybrid automatic repeat request (HARQ) may be applied. After transmission of the msg3, the terminal may drive a specific timer and monitor a contention resolution (CR) message until the timer expires (1c-30). In addition to a CR medium access control (MAC) CE, the CR message may include an RRC connection setup or RRC connection reestablishment message depending on a purpose of a random access.

Figure 1D:
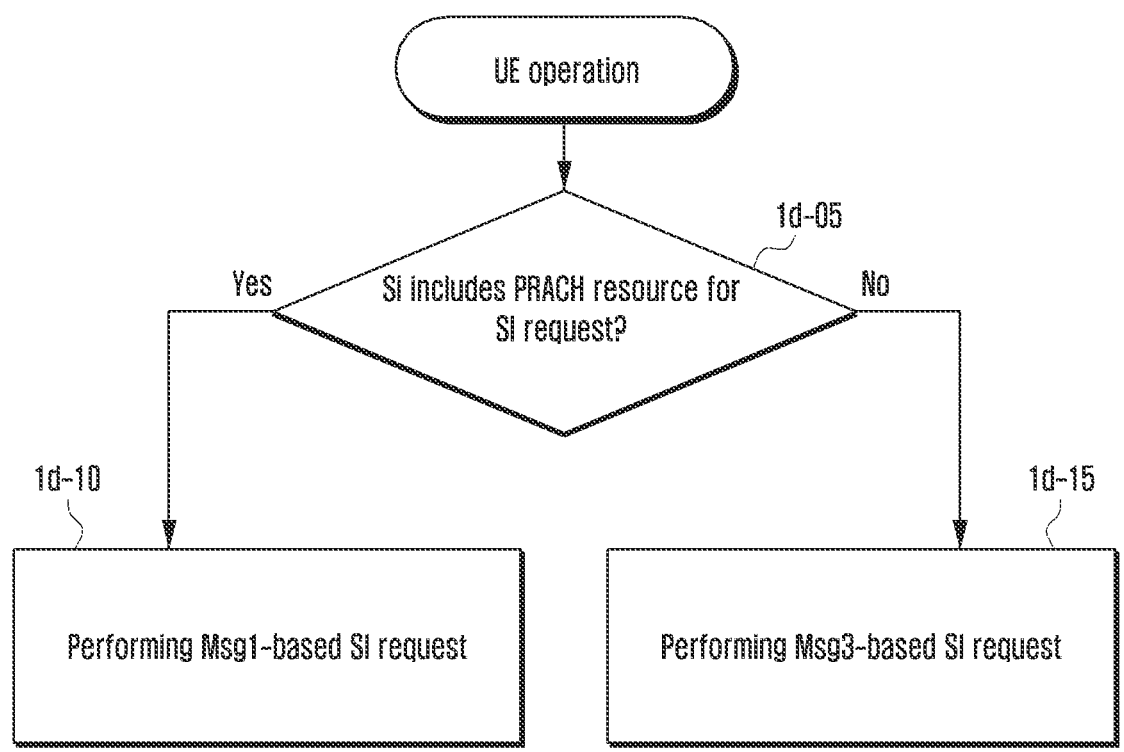
FIG. 1D illustrates a process of selecting an msg1-based or msg3-based SI request method according to an embodiment of the disclosure.

FIG. 1D illustrates a process of selecting an msg1-based or msg3-based SI request method according to an embodiment of the disclosure.

In order to request system information other than minimum SI (MIB and SIB1), a terminal may use a random access. The terminal may request, from a network, a system information (SI) message which the terminal desires to receive, by using msg1 (preamble) or msg3. The SI message may include one or more SIBs, and an SIB to be included in one SI message may be determined according to base station implementation. In operation 1d-05, the terminal may determine whether physical random access channel (PRACH) resource information which may be used for an SI request is included in an SIB1 that is periodically broadcasted. The PRACH resource information includes preamble ID (or index) information (prach-ConfigIndex) used for an SI request and radio resource information for transmitting the preamble. In case that the information is included, in operation 1d-10, the terminal may request system information other than the minimum SI by using msg1 dedicated for the SI request. Otherwise, in operation 1d-15, the terminal may request system information other than the minimum SI by using msg3. In this case, the terminal may transmit a preamble used for the general random access.

The disclosure proposes a method for reporting, to a base station, predetermined information in a random access process performed to request the system information. The method may also be extended and applied to a random access process triggered by another purpose. The information may be used by a base station to optimize a service area in the future.

FIG. 1E illustrates an msg1-based SI request process according to an embodiment of the disclosure.

A base station 1e-10 may provide, to a terminal 1e-05, configuration information required in an msg1-based SI request process by using predetermined system information SIB1 (1e-15). The configuration information may include information on an SI message, for requesting of which each preamble allocated for an SI request can be used. In case that the information is not provided, the preamble(s) allocated for the SI request may be considered to be used to request all SI messages which are not currently being broadcasted. Scheduling information on each SI message and whether each SI message is currently being broadcasted may be provided to the terminal via the SIB 1.

In case that the terminal 1e-05 is required to obtain a predetermined SI message which is not currently being broadcasted (1e-20), and has received the msg1-based SI request-related configuration information, the msg1-based SI request process may be triggered (1e-25). For example, in operation 1e-20, the terminal 1e-05 may identify that a predetermined SI message is not being broadcasted. In addition, in operation 1e-25, the terminal 1e-05 may start the msg1-based SI request process.

The terminal 1e-05 may transmit a preamble corresponding to the requested SI message to the base station 1e-10 (1e-30). The base station 1e-10 having successfully received the preamble may transmit an RAR message including only an RAPID to the terminal (1e-35), and may broadcast an SI message requested by the terminal. The terminal having received the RAR may consider that the SI request has been successfully transferred to the base station (1e-40), and may receive the requested SI message by using scheduling information of the requested SI message included in the SIB1 (1e-45).

FIG. 1F illustrates an msg3-based SI request process according to an embodiment of the disclosure.

A base station 1f-10 may provide, to a terminal 1f-05, scheduling information on each SI message and whether each SI message is currently being broadcasted, by using predetermined system information SIB1 (1f-15). In the embodiment described in FIG. 1F, the SIB1 does not include configuration information related to an msg1-based SI request.

In case that the terminal 1f-05 is required to obtain a predetermined SI message which is not currently being broadcasted (1f-20), and has not received the msg1-based SI request-related configuration information, the msg3-based SI request process may be triggered (1f-25). For example, in operation 1f-20, the terminal 1f-05 may identify that a predetermined SI message is not being broadcasted. In addition, in operation 1f-25, the terminal 1f-05 may start the msg3-based SI request process.

The terminal 1f-05 may transmit a predetermined preamble to the base station 1f-10 (1f-30). The base station 1f-10 having successfully received the preamble may transmit an RAR message to the terminal 1f-05 (1f-35). The terminal 1f-05 having received the RAR may report msg3 to the base station 1f-10 by using a UL grant (uplink scheduling information) indicated by the RAR (1f-40). The msg3 may include an RRCSystemInfoRequest message. The RRC message may store a list of SI messages requested by the terminal 1f-05. Since a positioning-related SI message (which may be referred to as PosSI) is also introduced in the Rel-16 NR standard, the terminal 1f-05 may request a positioning-related SI message which is not being broadcasted, via the RRC message. The base station 1f-10 having received the msg3 may transmit an msg4 message to the terminal 1f-05 (1f-45), and may broadcast an SI message requested by the terminal 1f-05. The terminal 1f-05 having received the msg4 may consider that the random access process has been successfully completed (1f-50), and may receive the requested SI message (1f-55).

Figure 1G:
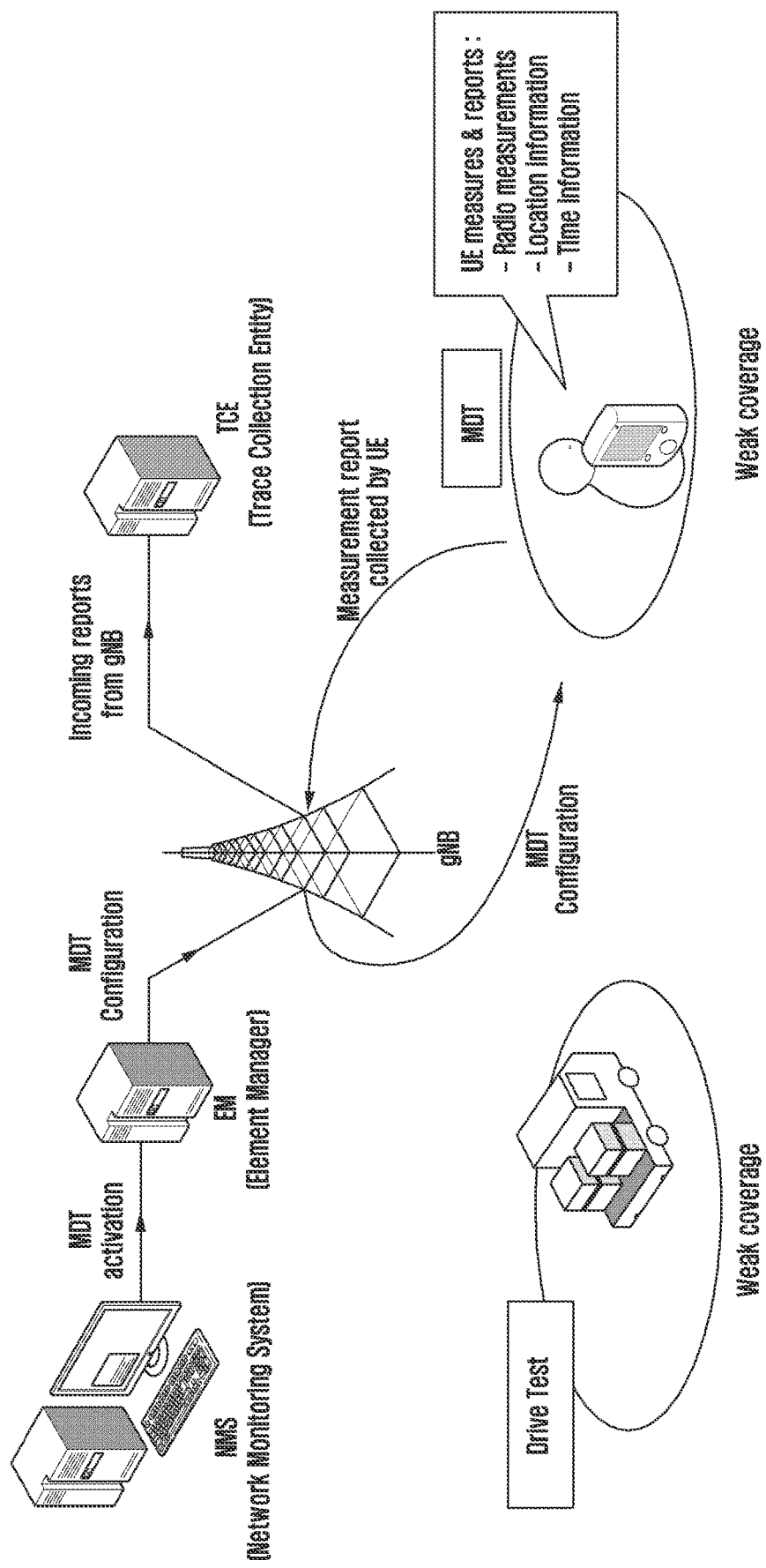
FIG. 1G illustrates a technology for collecting and reporting cell measurement information according to an embodiment of the disclosure.

FIG. 1G illustrates a technology for collecting and reporting cell measurement information according to an embodiment of the disclosure.

When constructing or optimizing a network, a mobile communication service provider may usually measure signal strength in an expected service area, and may go through a process of arranging or re-adjusting base stations in a service area based on the signal strength. The service provider loads signal measurement equipment on a vehicle and collects cell measurement information in the service area, which may require a lot of time and money. The process generally uses a vehicle, and thus may be commonly referred to as a drive test. In order to support an operation such as a cell re-selection operation, a handover operation, and serving cell addition when moving between cells, a terminal may be equipped with a function of capable of measuring a signal and a function of reporting to a base station. Therefore, instead of the drive test, a terminal in the service area may be used, which is referred to as minimization of drive test (MDT). The service provider may configure an MDT operation to specific terminals via various configuration devices of the network. In addition, the terminals may collect signal strength information from a serving cell and neighboring cells in a connected mode (RRC_Connected), an idle mode (RRC_Idle), or an inactive mode (RRC_Inactive), and store the signal strength information. In addition, various information such as location information, time information, and signal quality information may be stored together. The stored information may be reported to the network when the terminals are in the connected mode, and the information may be transmitted to a specific server.

The MDT operation may be largely classified as immediate MDT and logged MDT.

The immediate MDT may directly report collected information to the network. The immediate MDT is required to directly report the collected information to the network, and thus only a terminal in the connected mode may perform the immediate MDT. In general, a radio resources management (RRM) measurement process for supporting operations such as handover and serving cell addition may be reused. In addition, location information, time information, and the like may be additionally reported.

The logged MDT may store collected information without directly reporting the same to the network. The logged MDT is characterized in that after a terminal switches to the connected mode, the terminal reports the stored information to the network. In general, a terminal in the idle mode which cannot directly report to the network may perform the logged MDT. A terminal in the inactive mode introduced in the next-generation mobile communication system may perform the logged MDT. As shown in Table 2 below, when a specific terminal is in the connected mode, the network may provide configuration information for performing a logged MDT operation to the terminal, and the terminal may collect and store the configured information after switching to the idle mode or the inactive mode.

TABLE 2

| MDT operation | RRC state |
| --- | --- |
| Immediate MDT | RRC_Connected |
| Logged MDT | RRC_Idle, RRC_Inactive |

Figure 1H:
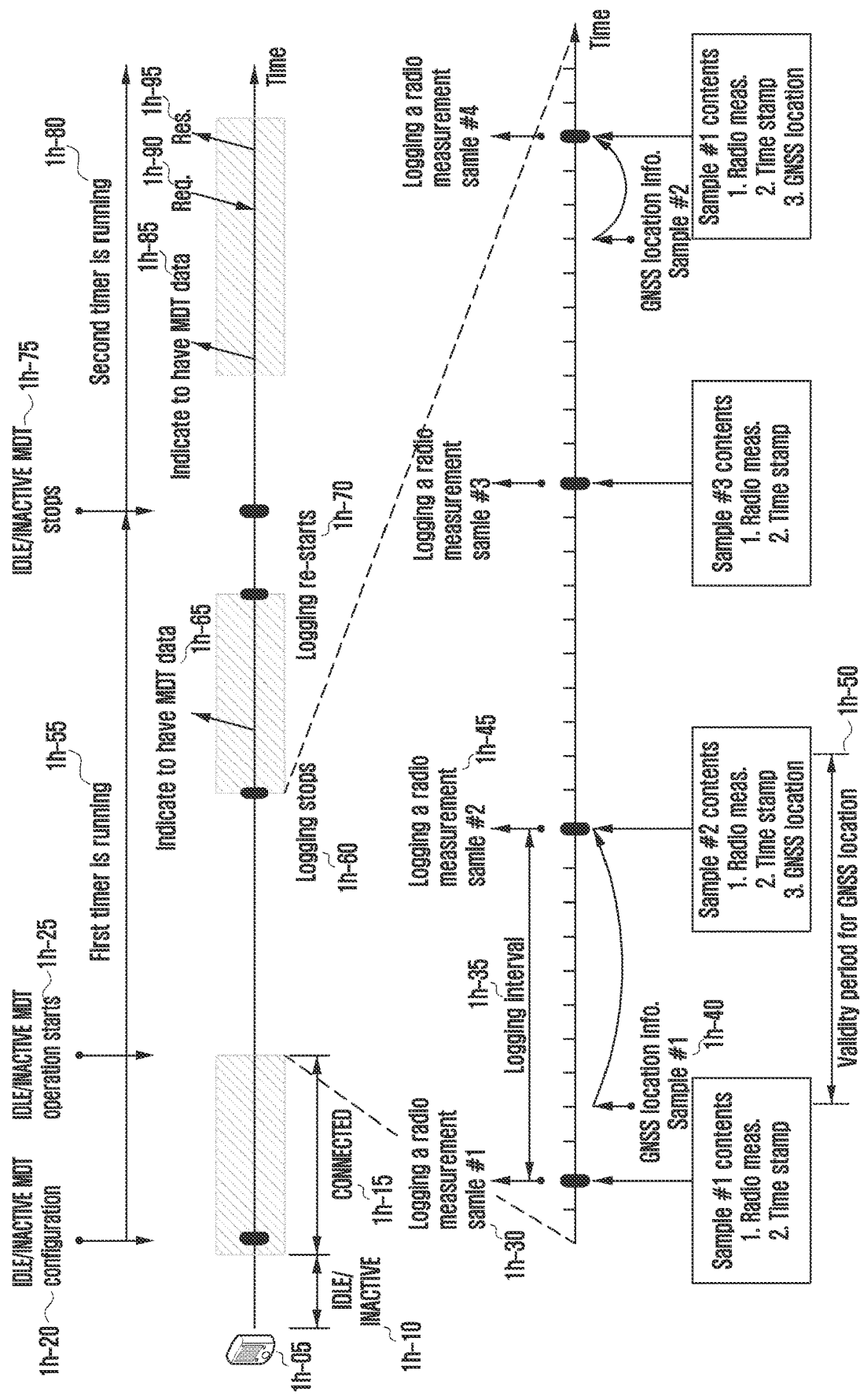
FIG. 1H illustrates a method for collecting and reporting cell measurement information according to an embodiment of the disclosure.

FIG. 1H illustrates a method for collecting and reporting cell measurement information according to an embodiment of the disclosure.

Referring to FIG. 1H, a terminal 1h-05 may switch from an idle mode or an inactive mode 1h-10 to a connected mode 1h-15. In the connected mode, via an immediate MDT operation, the terminal may collect MDT data and report the same to a base station. The terminal switched to the connected mode may receive logged MDT configuration information performed in the idle mode or the inactive mode from the base station (1h-20). The configuration information may be transmitted to the terminal, the configuration information including a predetermined RRC message, and the terminal having received the message may drive a first timer (1h-55). The terminal may perform a logged MDT operation in an idle mode or inactive mode interval until the first timer expires. A value of the first timer may be included in the logged MDT configuration information. When the terminal switches to the idle mode or the inactive mode, according to the received configuration information, the terminal may perform logged MDT (1h-25). The terminal may store collected information for each logging interval 1h-35 which is a configured period (operations 1h-30 and 1h-45). In addition, in case that valid location information 1h-40 has been collected, the information may also be stored. In relation to whether the location information is valid, when a predetermined time 1h-50 does not elapse after the information is collected, the information may be determined to be valid. The predetermined time may be shorter than or equal to the logging interval. Even before the first timer expires, the terminal may pause the logged MDT operation being performed, when switching to the connected mode (1h-60). However, the first timer may be continuously driven without stopping even in a connected mode interval. For example, the first timer may be continuously driven regardless of a change in an RRC state. However, when a terminal memory for storing MDT data is insufficient and thus the memory cannot store the data anymore, or when the logged MDT configuration information is released, the first timer may be stopped. The case in which the logged MDT configuration information is released may be the case in which other logged MDT configuration information is provided from a serving radio access technology (RAT) or another RAT, or the case in which the terminal is detached or power is cut off. During an RRC connection establishment or RRC connection resume process, the terminal may report to the base station that the terminal itself stores collection information (MDT data), by using an RRC setup complete message or an RRC resume complete message (1h-65).

The connection establishment process may be a process in which the terminal switches from the idle mode to the connected mode. As follows, the process may generally include a three-stage process, and three types of RRC messages may be used.

Stage 1: a terminal transmits an RRC setup request message to a base station

Stage 2: a base station transmits an RRC setup message to a terminal

Stage 3: a terminal transmits an RRC setup complete message to a base station.

The connection resume process may be a process in which the terminal switches from the inactive mode to the connected mode. As follows, the process may generally include a three-stage process, and three types of RRC messages may be used.

Stage 1: a terminal transmits an RRC resume request message to a base station

Stage 2: a base station transmits an RRC resume message to a terminal

Stage 3: a terminal transmits an RRC resume complete message to a base station

A terminal may report, to a target base station, information indicating that the terminal has the collection information during RRC connection reestablishment and handover processes, in addition to the connection establishment process or the connection resume process. In case that the logged MDT has been configured, but there is no collected and stored information yet, the report may be omitted. The base station having received the report may request a report of MDT data being stored by the terminal, when necessary. The unreported MDT data may be required to be continuously stored by the terminal for a predetermined time. In case that the terminal switches back to the idle mode or the inactive mode and the first timer has not yet expired, the logged MDT operation may be restarted again (1h-70). In case that the first timer expires, the logged MDT operation may be stopped (1h-75). The terminal having stopped the operation may drive a second timer (1h-80), and may maintain the stored MDT data until the timer expires. After the timer expires, whether to delete the stored MDT data may be determined by terminal implementation. A value of the second timer may be included in the logged MDT configuration information or may not configured for the logged MDT configuration information, and a predefined value may be applied. When the terminal switches back to the connected mode, the terminal may report to the base station that the terminal itself stores collection information (MDT data) (1h-85). In this case, the base station may use a predetermined RRC message to request a report of MDT data being stored by the terminal (1h-90). Accordingly, the terminal may include, in a predetermined RRC message, the MDT data being stored, and may report the message to the base station (1h-95).

Figure 1I:
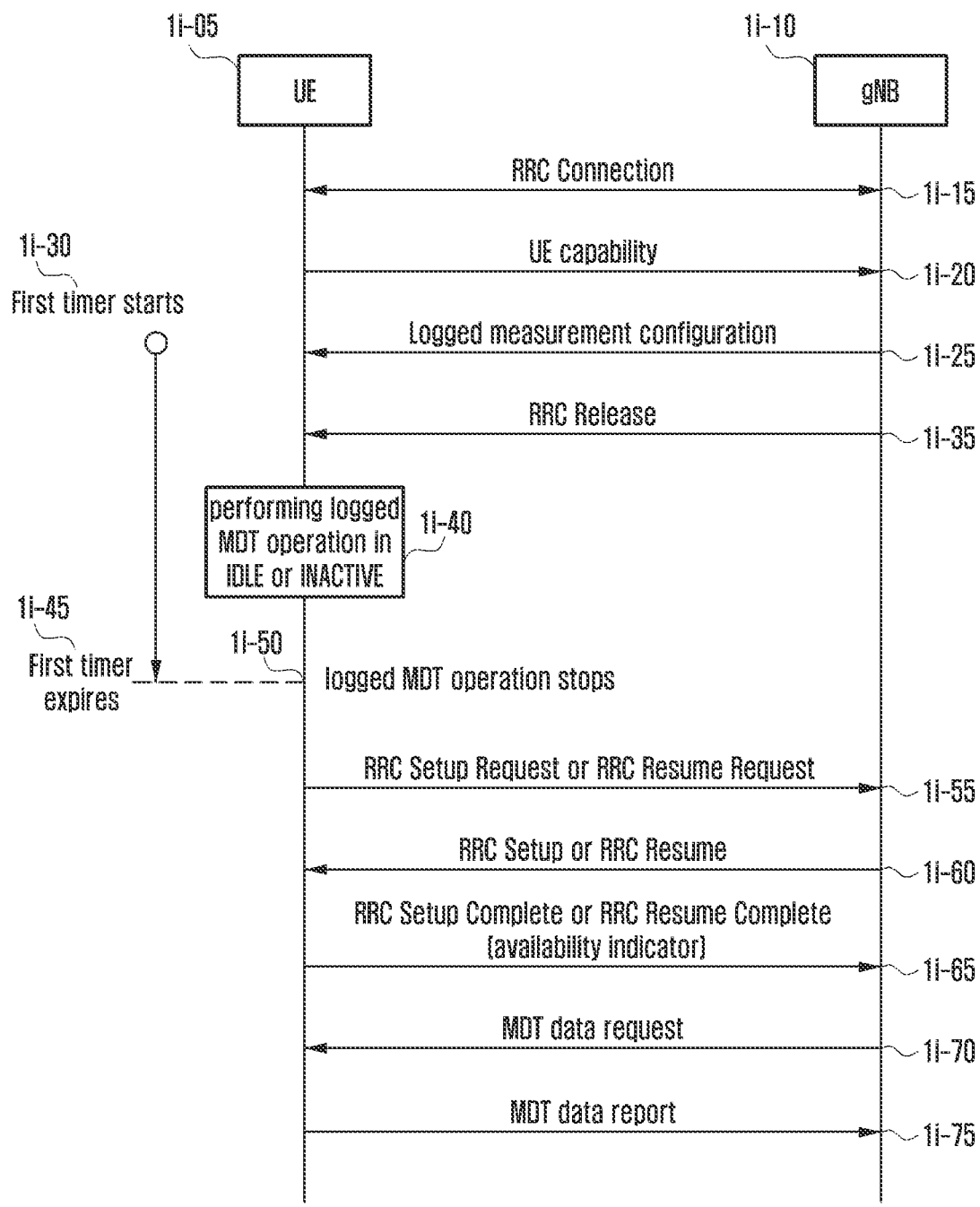
FIG. 1I illustrates a flowchart of an operation of collecting and reporting cell measurement information according to an embodiment of the disclosure.

FIG. 1I illustrates a flowchart of an operation of collecting and reporting cell measurement information according to an embodiment of the disclosure.

A terminal 1i-05 may connect to a base station 1i-10 at operation 1i-15. The terminal 1i-05 may provide terminal capability information to the base station at operation 1i-20, and may indicate whether the terminal itself supports an MDT operation and a frequency which can be measured. The base station 1i-10 may include, in a predetermined RRC message, configuration information required to perform a logged MDT operation, and transmit the RRC message to the terminal 1i-05 at operation 1i-25. For example, the configuration information may include at least one piece of the following information.

Trace Reference information

Trace Recording Session Reference information

Trace collection entity (TCE) ID information: a base station may transmit MDT data information, reported from a terminal, to a data server designated by the TCE ID.

Absolute time information (absolute time): absolute time in the current cell which provides logged MDT configuration information Area Configuration: area information capable of collecting and storing measurement information via a logged MDT operation, the information being indicated in units of cells. In addition, the area configuration may include RAT information indicating collection of measurement information. A list included in the RAT information is a black list or a white list. In case that the list is a black list, cell measurement information may be collected for RATs which are not included in the list. In case that the list is a white list, cell measurement information is not collected for RATs which are not included in the list.

Logging Duration: the value of the first timer, and when the first timer is driving, a logged MDT operation may be performed in an idle mode or an inactive mode.

Logging Interval: the period at which the collected information is stored.

plmn-IdentityList (i.e. MDT public land mobile network (PLMN) list): PLMN list information, and the plmn-IdentityList may include PLMN information for performing the logged MDT operation, reporting whether to store MDT data, and reporting the MDT data.

An indicator indicating whether a logged MDT operation is performed in an idle mode, an inactive mode, or both modes. The RRC state for performing the logged MDT operation may be indicated using the indicator. Alternatively, it may be defined that the logged MDT operation is always performed in the idle mode and the inactive mode without the indicator. The terminal may perform the logged MDT operation only in the RRC state indicated by the indicator.

An indicator indicating whether to collect and store beam level measurement information. A beam antenna may be applied in the next-generation mobile communication system. It may be defined that, without the indicator, beam level measurement is always collected and stored for the frequency at which a beam-based operation is performed.

Information on the maximum number of beams which are collected or stored, and information on the minimum signal strength of stored beams. The terminal may omit storage of information of a beam, the signal strength of which is weaker than the minimum signal strength. In case that all of the beams are weaker than the configured minimum signal value, the terminal may store information of a beam having the strongest signal strength among the beams, or may include an indicator indicating that all of the beams are weaker than the configured minimum signal value.

An indicator indicating whether an MDT retrieval operation can be triggered in a two-stage resume process (RRC resume)

The terminal 1$i$-05 having received the logged MDT configuration information may drive a first timer at operation 1$i$-30. A value of the first timer may be configured as equal to the value of the logging duration. The base station may switch the terminal 1$i$-05 to an idle mode or an inactive mode by using an RRC release message at operation 1$i$-35. Depending on an RRC state to which the terminal is switched, the RRC release message may include configuration information for operation in the RRC state. In case that the first timer is driving, the terminal 1$i$-05 may perform the logged MDT in the idle mode or the inactive mode at operation 1$i$-40. The terminal may measure the signal strengths of a serving cell and neighboring cells, and acquire location information thereof. When beam level measurement is configured, a signal strength value for a beam having a value larger than the configured minimum value may be collected and stored in a serving cell and an adjacent cell. The maximum number of beams which can be stored may be configured or predefined. The signal strength may denote RSRP, RSRQ, or SINR. The collected information may be stored for each logging interval period. When the first timer expires at operation 1$i$-45, the logged MDT operation may be stopped at operation 1$i$-50.

In the case in which the terminal 1$i$-05 is in the idle mode or the inactive mode via the RRC release message and receives RAN or CN paging from the base station, or in the case in which mobile oriented (MO) data transmission is activated, the terminal 1$i$-05 may initialize an establishment process or a resume process for switching from the idle mode or the inactive mode to a connected mode.

The establishment process or the resume process may include stage 1: a terminal transmits an RRC setup request message or an RRC resume request message to a base station at operation 1$i$-55 stage 2: a base station transmits an RRC setup message or an RRC resume message to a terminal at operation 1$i$-60 stage 3: a terminal transmits an RRC setup complete message or an RRC resume complete message to a base station at operation 1$i$-65.

The terminal 1$i$-05 may include an indicator indicating whether MDT data being stored by the terminal itself exists in the RRC setup complete or RRC resume complete message. When necessary, the base station 1$i$-10 having received the RRC setup complete message may request a report of the MDT data by using a predetermined RRC message, UEInformationRequest at operation 1$i$-70. The terminal 1$i$-05 having received the request may report the MDT data to the base station 1$i$-10 by using a predetermined RRC message, UEInformationResponse at operation 1$i$-75.

Figure 1J:
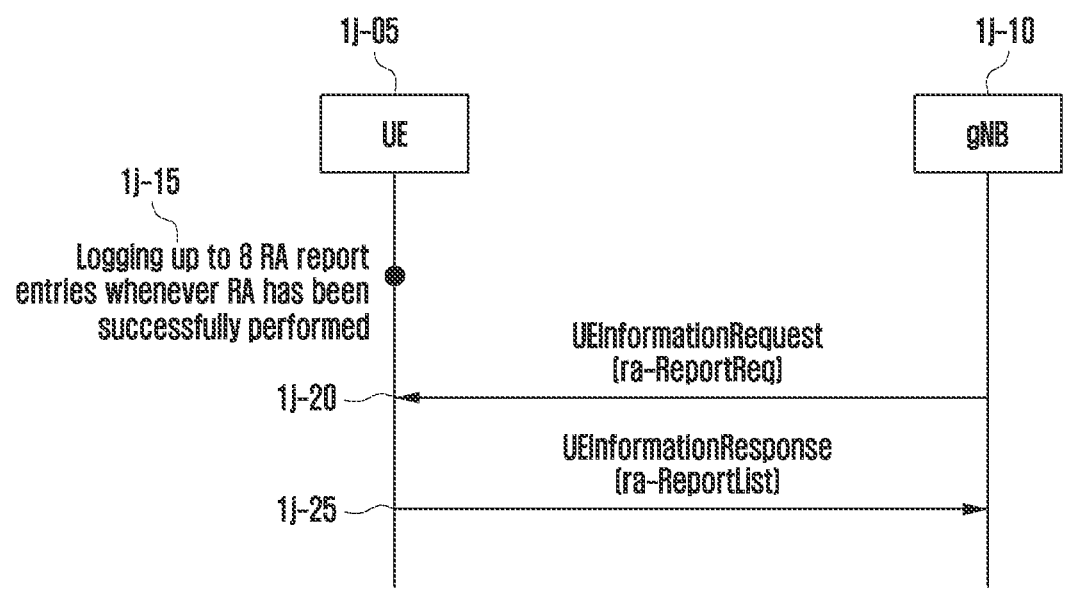
FIG. 1J illustrates a flowchart of an operation of requesting and collecting a random access report according to an embodiment of the disclosure.

FIG. 1J illustrates a flowchart of an operation of requesting and collecting a random access report according to an embodiment of the disclosure.

A random access report (RA report) is a series of processes in which a terminal 1$j$-05 collects information related to a recently successful random access process and reports the information to a base station 1$j$-10 (e.g., a gNB). According to an embodiment, the terminal 1$j$-05 may store up to 8 pieces of information related to a random access process at operation 1$j$-15.

Referring to Table 3 below, the base station 1$j$-10 may request, from the terminal 1$j$-05 in a connected mode, RA report information stored by the terminal 1$j$-05, by using a UEInformationRequest message at operation 1$j$-20. The terminal 1$j$-05 having received the request may report the stored RA report information to the base station 1$j$-10 by using a UEInformationResponse message at operation 1$j$-25. ASN.1 of RA report information stored in the UEInformationResponse is shown in Table 3 below. Each RA report entry may include ID information of a cell for which a random access has been performed, ra-InformationCommon IE including specific random access information, and a raPurpose field indicating a purpose for which a random access has been performed. For example, "requestForOtherSI" in the raPurpose field may be configured when a successfully completed random access has been performed for an msg1-based SI request. The terminal 1$j$-05 may store up to 8 RA report entries and report the same to the base station 1$j$-10.

TABLE 3

```
RA-ReportList-r16 ::= SEQUENCE (SIZE (1..maxRAReport-r16)) OF RA-
Report-r16
    RA-Report-r16 ::=              SEQUENCE {
        cellId-r16                 CHOICE {
            cellGlobalId-r16           CGI-Info-Logging-r16,
            pci-arfcn-r16              SEQUENCE {
                physCellId-r16             PhysCellId,
                carrierFreq-r16            ARFCN-ValueNR
            }
        },
        ra-InformationCommon-r16         RA-InformationCommon-r16,
        raPurpose-r16                    ENUMERATED {accessRelated,
beamFailureRecovery, reconfigurationWithSync, ulUnSynchronized,
                                  schedulingRequestFailure,
noPUCCHResourceAvailable, requestForOtherSI,
                                  spare9, spare8, spare7, spare6, spare5, spare4,
spare3, spare2, spare1}
    }
```

Figure 1K:
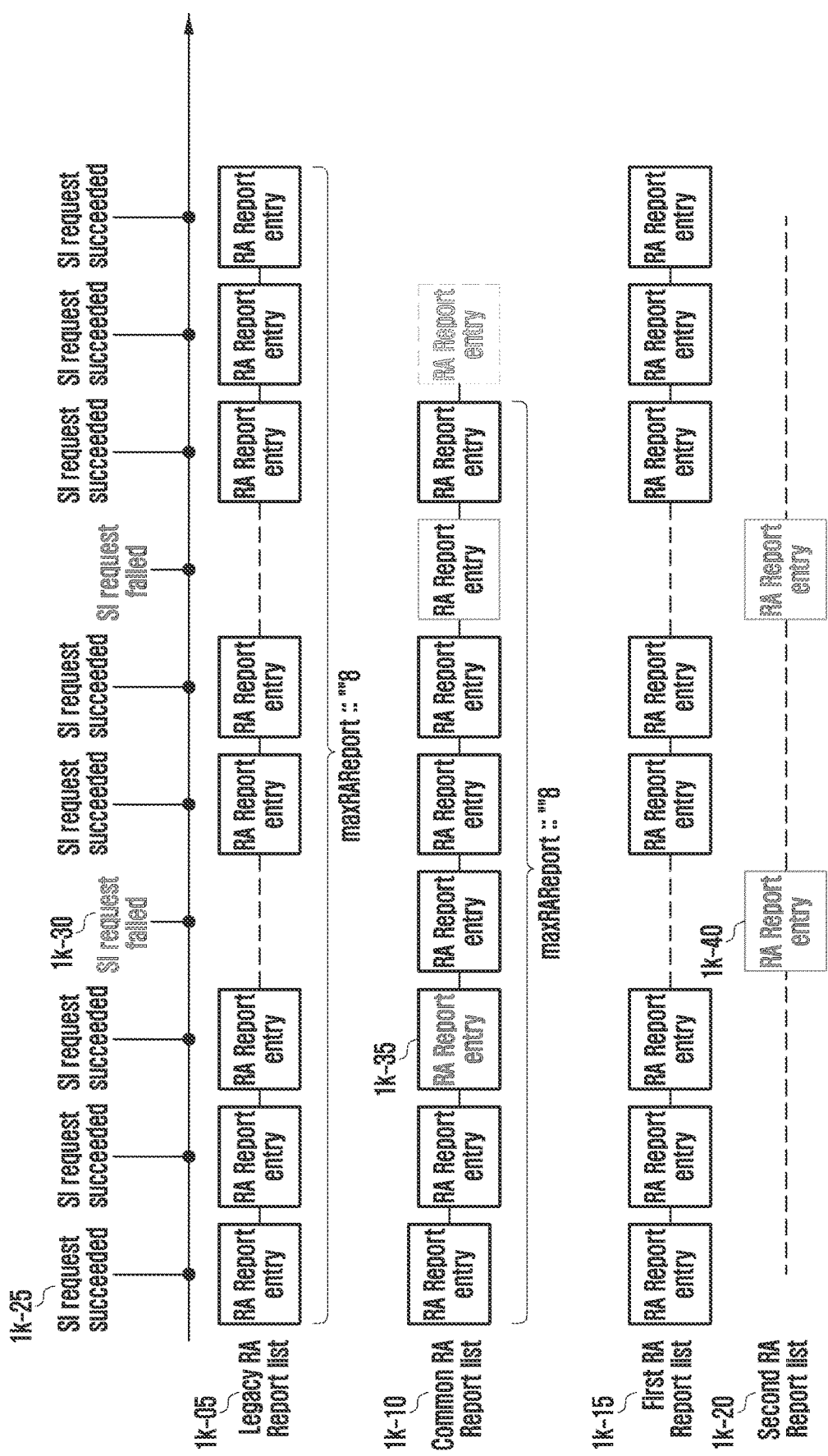
FIG. 1K illustrates a method for storing SI request-related information in a random access report according to an embodiment of the disclosure.
Figure 10:
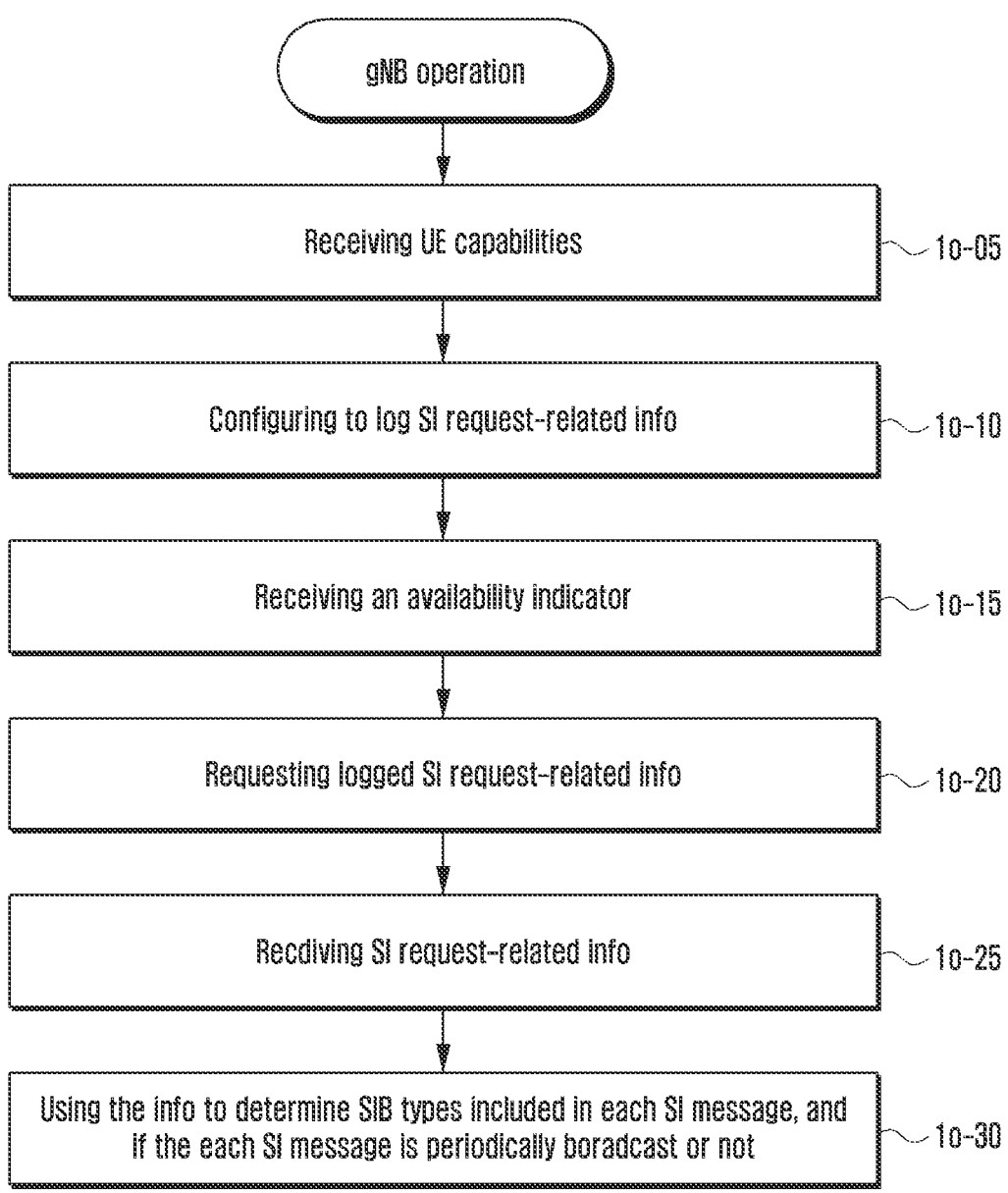

FIG. 1K illustrates a method for storing SI request-related information in a random access report according to an embodiment of the disclosure.

The disclosure is characterized in that SI request-related information in which a random access has successfully been completed or SI request-related information in which a random access has been attempted but failed is included in an RA report entry, and reported to a base station. Since the SI request is made via a random access process, SI request-related information may be reported via an RA report. However, an RA report 1k-05 generally considers only a random access which is successfully completed, and does not consider information related to a random access which has failed. For example, in case that 10 random accesses have been performed for an SI request and 2 random access processes 1k-30 have failed, only RA report entries corresponding to 8 successful random access processes 1k-25 may be included in an RA-ReportList. Therefore, it is required to improve the RA report so that a random access which has been performed for an SI request but failed can be also considered.

The disclosure may propose the following two options.

First option: one RA-ReportList 1k-10 is maintained, but an RA report entry 1k-35 corresponding to a failed random access may also be included. In this case, the failed random access may be limited to a random access triggered for an SI request.

Second option: multiple RA-ReportLists may be included. A first RA-ReportList 1k-15 may include only an RA report entry corresponding to a successful random access. The first RA-ReportList may include all random accesses regardless of a purpose of an RA or may include only a random access for an SI request purpose. A new second RA-ReportList 1k-20 may include only an RA report entry 1k-40 corresponding to a failed random access. In this case, the failed random access may be limited to a random access triggered for an SI request.

In the first option or the second option, the RA report entry corresponding to the failed random access may include the following additional information in addition to information included in the general RA report entry.

An SI message and SIB which has been requested by a terminal

All of SI message information which has been requested but not broadcasted and SIB information required when the terminal requests the SI message are included in an RA report entry. In case that all of SIBs belonging to the requested SI message has been required, there is no need to separately include SIB information in the RA report entry. The information may be used for a base station to determine an SIB included in each SI message. For example, the base station may include frequently requested SIBs in one SI message, thereby minimizing distributed requests of multiple SI messages. Alternatively, the base station may include the frequently requested SIBs in one SI message and always broadcast the SI message. The reported SI message information or SIB information may be reported to the base station in the form of a bitmap. Each bit configuring the bitmap may correspond to one SI message or SIB, and may be used to indicate whether the SI message or SIB is requested. A bitmap indicating an SI message and a bitmap indicating an SIB may be separately defined.

An SIB which has been required (or acquired) by the terminal

All of SIBs which have been required (or acquired) by the terminal may be included regardless of whether broadcasting is performed. This may be used to determine an SIB belonging to (included in) an SI message which has previously (already) been broadcasted. The information may be used for the base station to further optimize and determine the type of SIBs included in SI messages which have previously (already) been broadcasted. The reported SI message information or SIB information may be reported to the base station in the form of a bitmap.

In the case of an msg3-based posSI request, a posSI message and positioning SIB (posSIB) which has been requested by the terminal All of posSI message information which has been requested but not broadcasted and posSIB information which caused the terminal to request the posSI message (was necessary for the terminal) are included, and in case that all of posSIBs belonging to the requested SI message has been required, there is no need to separately include posSIB information. The reported SI message information or SIB information may be reported to the base station in the form of a bitmap.

In the case of an msg3-based posSI request, a posSIB which has been required (or acquired) by the terminal All of posSIBs which have been required (or acquired) by the terminal may be included regardless of whether broadcasting is performed. This may be used to determine a posSIB belonging to (included in) a posSI message which has previously (already) been broadcasted. The information may be used for the base station to further optimize and determine the type of posSIBs included in posSI messages which have previously (already) been broadcasted. The reported SI message information or SIB information may be reported to the base station in the form of a bitmap.

An indicator indicating whether an SI request has succeeded or failed.

For example, in case that all system information requested by the terminal has been successfully received, the terminal may configure the success indicator in the RA report entry. In case that only a part of system information has been successfully received, the terminal may indicate and report system information which has succeeded and system information which has failed. The reported SI message information or SIB information may be reported to the base station in the form of a bitmap. In case that the terminal has triggered an msg1-based SI request and has received an RAR including only an RAPID from the base station, the terminal may configure the success indicator in the RA report entry. In case that the terminal has triggered an msg3-based SI request and the terminal has received acknowledgment for an RRCSystemInfoRequest message from a lower layer of RRC, the terminal may configure the success indicator in the RA report entry. On the other hand, in case that the number of preambles having been transmitted by the terminal in order for an SI request reaches as much as preambleTranMax+1, the terminal may configure the failure indicator in the RA report entry.

An indicator indicating whether an SI request has been performed in an NUL or SUL.

The base station may provide, to the terminal, two types of uplinks which are a normal uplink (NUL) and a supplementary uplink (SUL). In this case, the terminal may select one of the two uplinks to make an SI request. Therefore, the base station can optimize an SI request operation in an appropriate uplink only when the base station recognizes an uplink in which the SI request is made.

An indicator indicating whether a requested SIB is an area-based SIB.

In case that a value of an areaScope field corresponding to the requested SIB is configured to be true, the terminal may configure an indicator corresponding to the SIB in the RA report entry. The reported information with regard to each SI message or each SIB may be reported to the base station in the form of a bitmap.

An indicator indicating whether a purpose of an SI request is a general SIB or PosSIB Absolute time when an SI request has been triggered. For example, the absolute time when the first preamble is transmitted for an SI request FIG. 1L illustrates time information to include SI request-related information according to an embodiment of the disclosure.

In addition to the above-mentioned information, a terminal may include new time information in an RA report entry. In the disclosure, time information required for optimizing an SI request operation may be proposed as follows. Case (a) of FIG. 1L illustrates the type of time information which may be stored in an RA report when an msg1-based SI request operation has been performed, and case (b) of FIG. 1L illustrates type of time information which may be stored in an RA report when an msg3-based SI request operation has been performed. The start and end of each time information are as shown in Table 4 and Table 5 below, and the terminal may configure and store time information according to the following definition.

Table 4 shows the type of time information which may be stored in an RA report when an msg1-based SI request operation has been performed. Table 5 shows the type of time information which may be stored in an RA report when an msg3-based SI request operation has been performed.

TABLE 4

| | Start time (for time related measurements) | End time (for time related measurements) |
|---|---|---|
| Time A | When triggering an SI request (1l-05). For example, when first transmitting a preamble allocated for the SI request | When a requested SI message(s) is successfully received (1l-15) |
| Time B | When first transmitting a preamble allocated for an SI request (1l-05) | When a random access for an SI request has failed (1l-20). For example, when the number of preambles which have been transmitted for the SI request reaches preambleTransMax + 1 |
| Time C | When first transmitting a preamble allocated for an SI request (1l-05) | When reporting an RA report to a base station (1l-25). For example, when receiving a UEInformationRequest message including an indicator for requesting a report of the RA report, or when storing an RA report entry in a UEInformationResponse message according to the request |
| Time D | When a requested SI message(s) is successfully received (1l-15) | When reporting an RA report to a base station (1l-25). For example, when receiving a UEInformationRequest message including an indicator for requesting a report of the RA report, or when storing an RA report entry in a UEInformationResponse message according to the request |
| Time E | When a random access for an SI request has failed (1l-20). For example, when the number of preambles which have been transmitted for the SI request reaches preambleTransMax + 1 | When reporting an RA report to a base station (1l-25). For example, when receiving a UEInformationRequest message including an indicator for requesting a report of the RA report, or when storing an RA report entry in a UEInformationResponse message according to the request |
| Time O | When triggering an SI request (1l-05). For example, when first transmitting a preamble allocated for the SI request | When receiving an RAR message including only an RAPID corresponding to a preamble transmitted for an SI request (1l-10) |

TABLE 5

| | Start time (for time related measurements) | End time (for time related measurements) |
|---|---|---|
| Time F | When triggering an SI request (1l-30). For example, when first transmitting a preamble for the SI request | When a requested SI message(s) is successfully received (1l-50) |
| Time G | When triggering an SI request (1l-30). For example, when first transmitting a preamble for the SI request | When a random access for an SI request has failed (1l-55). For example, when the number of preambles which have been transmitted for the SI request reaches preambleTransMax + 1 |
| Time H | When transmitting an msg3 message including RRCSystemInfoRequest (1l-40) | When a requested SI message(s) is successfully received (1l-50) |

TABLE 5-continued

| | Start time (for time related measurements) | End time (for time related measurements) |
|---|---|---|
| Time I | When transmitting an msg3 message including RRCSystemInfoRequest (1l-40) | When a random access for an SI request has failed (1l-55). For example, when the number of preambles which have been transmitted for the SI request reaches preambleTransMax + 1 |
| Time J | When triggering an SI request (1l-30). For example, when first transmitting a preamble for the SI request | When reporting an RA report to a base station (1l-60). For example, when receiving a UEInformationRequest message including an indicator for requesting a report of the RA report, or when storing an RA report entry in a UEInformationResponse message according to the request |
| Time K | When transmitting an msg3 message including RRCSystemInfoRequest (1l-40) | When reporting an RA report to a base station (1l-60). For example, when receiving a UEInformationRequest message including an indicator for requesting a report of the RA report, or when storing an RA report entry in a UEInformationResponse message according to the request |
| Time L | When a requested SI message(s) is successfully received (1l-50) | When reporting an RA report to a base station (1l-60). For example, when receiving a UEInformationRequest message including an indicator for requesting a report of the RA report, or when storing an RA report entry in a UEInformationResponse message according to the request |
| Time M | When a random access for an SI request has failed (1l-55). For example, when the number of preambles which have been transmitted for the SI request reaches preambleTransMax + 1 | When reporting an RA report to a base station (1l-60). For example, when receiving a UEInformationRequest message including an indicator for requesting a report of the RA report, or when storing an RA report entry in a UEInformationResponse message according to the request |
| Time N | When a random access for an SI request has failed (1l-55). For example, when the number of preambles which have been transmitted for the SI request reaches preambleTransMax + 1 | When another requested SI message(s) is successfully received (1l-50), that is, timer N refers to time information between success and failure in two consecutive SI requests |

FIG. 1M illustrates a method for storing SI request-related information in a single random access report and reporting the same according to an embodiment of the disclosure.

A terminal 1m-05 may report terminal capability information to a first base station 1m-10 (1m-20). The terminal capability information may include an indicator indicating whether the terminal 1m-05 can record and report SI request-related information. The first base station 1m-10 may configure an operation of recording and reporting SI request-related information to the terminal 1m-05 by using a predetermined RRC message (1m-25).

The terminal 1m-05 may switch to an idle mode or an inactive mode (1m-30). The terminal 1m-05 may select an adjacent cell (1m-35). The terminal 1m-05 may receive SIB1 from a second base station 1m-15 (1m-40). The SIB1 includes scheduling information of each SI message, the type of an SIB belonging to each SI message, and information on whether each SI message is being broadcasted. The terminal 1m-05 may determine an SI message requiring a request, in consideration of the information included in the SIB1 (1m-45). The terminal 1m-05 may perform, to the second base station 1m-15, a random access process for an SI request (1m-50). In case that a preamble for the SI request is provided to the SIB1, an msg1-based SI request operation may be triggered, otherwise, an msg3-based SI request operation may be triggered. When the SI request operation succeeds or fails, the terminal 1m-05 may store RA-related information and SI request-related information in one RA report list (1m-55). In case that the terminal 1m-05 performs a cell re-selection operation during the SI request operation, the terminal 1m-05 may delete the SI request-related information and configuration in progress.

The terminal 1m-05 may switch to a connected mode (1m-60). The terminal 1m-05 may report, to the second base station 1m-15, an indicator indicating that the terminal itself stores SI request-related information (1m-65). For reference, in the general RA report operation, an indicator indicating that RA-related information is stored as described above is not reported. The second base station 1m-15 may request the information being stored by the terminal 1m-05, by using a UEInformationRequest message (1m-70), and the terminal 1m-05 having received the request may transmit a UEInformationResponse message including the information (1m-75).

FIG. 1N illustrates a flowchart of a terminal operation of storing SI request-related information in a single random access report according to an embodiment of the disclosure.

In operation 1n-05, a terminal may trigger a random access.

In operation 1n-10, the terminal may determine whether the triggered random access is for the purpose of an SI request.

In operation 1n-15, in case that the triggered random access is for the purpose of an SI request, the terminal may store RA-related information and SI request-related information as a content of an RA report (regardless of whether the random access is successful).

In operation 1n-20, in case that the triggered random access is not for the purpose of an SI request, the terminal may determine whether the random access has been successfully completed.

In operation 1n-25, in case that the random access has been successfully completed, the terminal may store the RA-related information as the content of the RA report.

In operation 1n-30, in case that the random access has not been successfully completed, the terminal does not store the RA-related information as the content of the RA report.

FIG. 1O illustrates a flowchart of a base station operation of storing SI request-related information in a single random access report according to an embodiment of the disclosure.

In operation 1o-05, a base station may receive terminal capability information from a terminal.

In operation 1o-10, the base station may configure, to the terminal, an operation of storing SI request-related information, by using a predetermined RRC message.

In operation 1o-15, the base station may receive an indicator indicating whether to store the SI request-related information from the terminal.

In operation 1o-20, the base station may request the terminal to report the SI request-related information.

In operation 1o-25, the base station may receive a report of the SI request-related information from the terminal.

In operation 1o-30, the base station may use the information to select SIB(s) configuring each SI message, and determine whether to broadcast each SI message periodically.

Figure 1P:
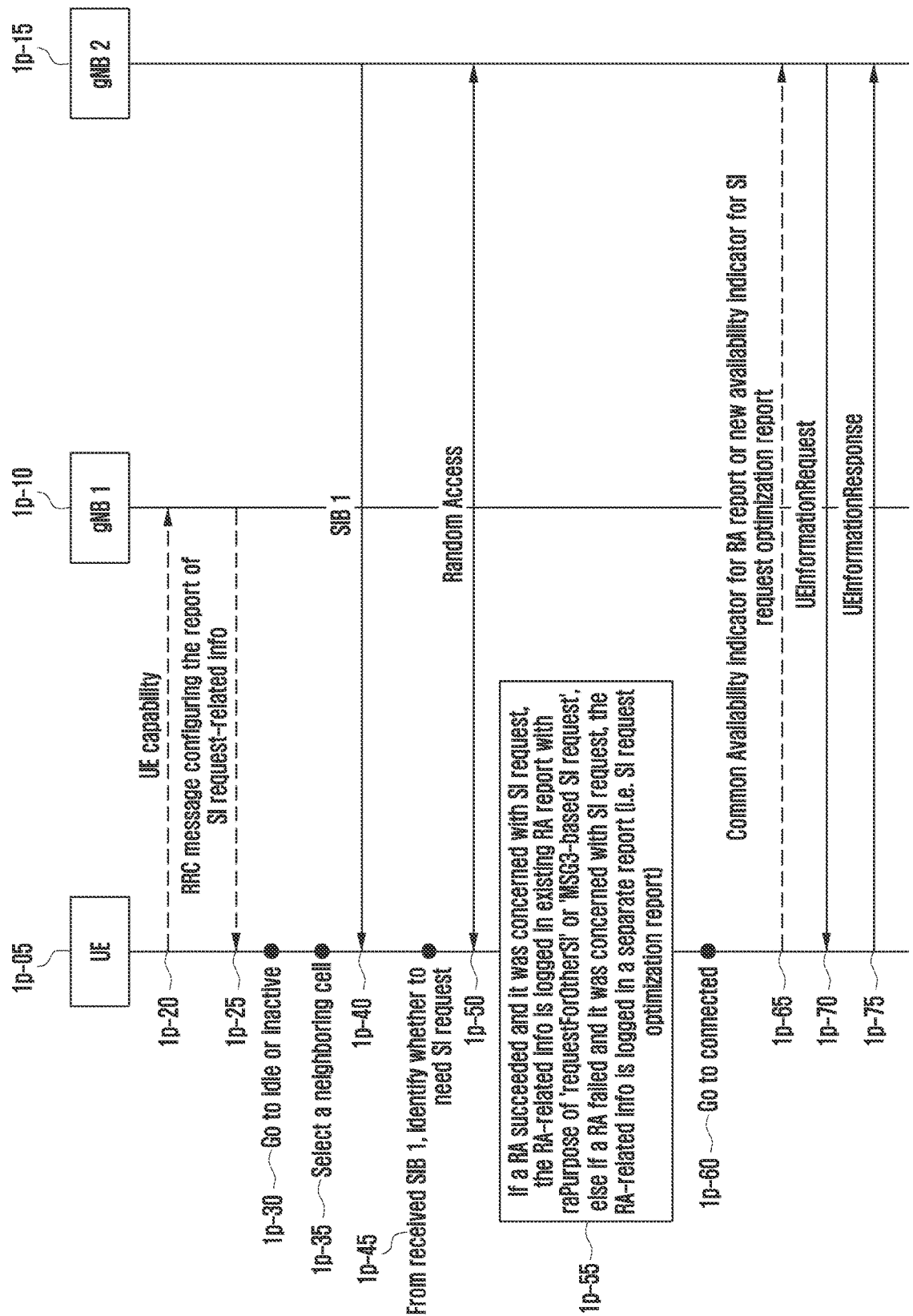
FIG. 1P illustrates a method for storing SI request-related information in multiple random access reports and reporting the same according to an embodiment of the disclosure.

FIG. 1P illustrates a method for storing SI request-related information in multiple random access reports and reporting the same according to an embodiment of the disclosure.

A terminal 1p-05 may report terminal capability information to a first base station 1p-10 (1p-20). The terminal capability information may include an indicator indicating whether the terminal 1p-05 can record and report SI request-related information. The first base station 1p-10 may configure an operation of recording and reporting SI request-related information to the terminal 1p-05 by using a predetermined RRC message (1p-25).

The terminal 1p-05 may switch to an idle mode or an inactive mode (1p-30). The terminal 1p-05 may select an adjacent cell (1p-35). The terminal 1p-05 may receive SIB1 from a second base station 1p-15 (1p-40). The SIB1 includes scheduling information of each SI message, the type of an SIB belonging to each SI message, and information on whether each SI message is being broadcasted. The terminal 1p-05 may determine an SI message requiring a request, in consideration of the information included in the SIB1 (1p-45). The terminal 1p-05 may perform, to the second base station 1p-15, a random access process for an SI request (1p-50). In case that a preamble for the SI request is provided to the SIB1, the terminal 1p-05 may trigger an msg1-based SI request operation. In case that the preamble for the SI request is not provided to the SIB1, the terminal 1p-05 may trigger an msg3-based SI request operation. When the SI request operation is successful, in the case of an msg1-based SI request or in the case of a "requestForOtherSI" or msg3-based SI request, the terminal 1p-05 may configure a raPurpose value in an RA report entry as a cause value indicating the msg1-based SI, requestForOtherSI, or msg3-based SI request. In addition, the terminal 1p-05 may store RA-related information and SI request-related information in a first RA-ReportList. When the SI request operation fails, in the case of an msg1-based SI request or in the case of a "requestForOtherSI" or msg3-based SI request, the terminal 1p-05 may configure a raPurpose value in an RA report entry as a cause value indicating the msg1-based SI, requestForOtherSI, or msg3-based SI request, and store RA-related information and SI request-related information in a second RA-ReportList (1p-55). For example, the successful SI request-related RA may be stored in the first RA-ReportList, and the failed SI request-related RA may be stored in the second RA-ReportList.

The terminal 1p-05 may switch to a connected mode (1p-60). The terminal 1p-05 may report, to the second base station 1p-15, an indicator indicating to the second base station 1p-15 that the terminal itself stores SI request-related information (1p-65). For reference, in the conventional RA report operation, an indicator indicating that RA-related information is stored as described above is not reported. The second base station 1p-15 may request the information being stored by the terminal 1p-05, by using a UEInformationRequest message (1p-70), and the terminal 1p-05 having received the request may transmit a UEInformationResponse message including the information to the second base station 1p-15 (1p-75).

Figure 1Q:
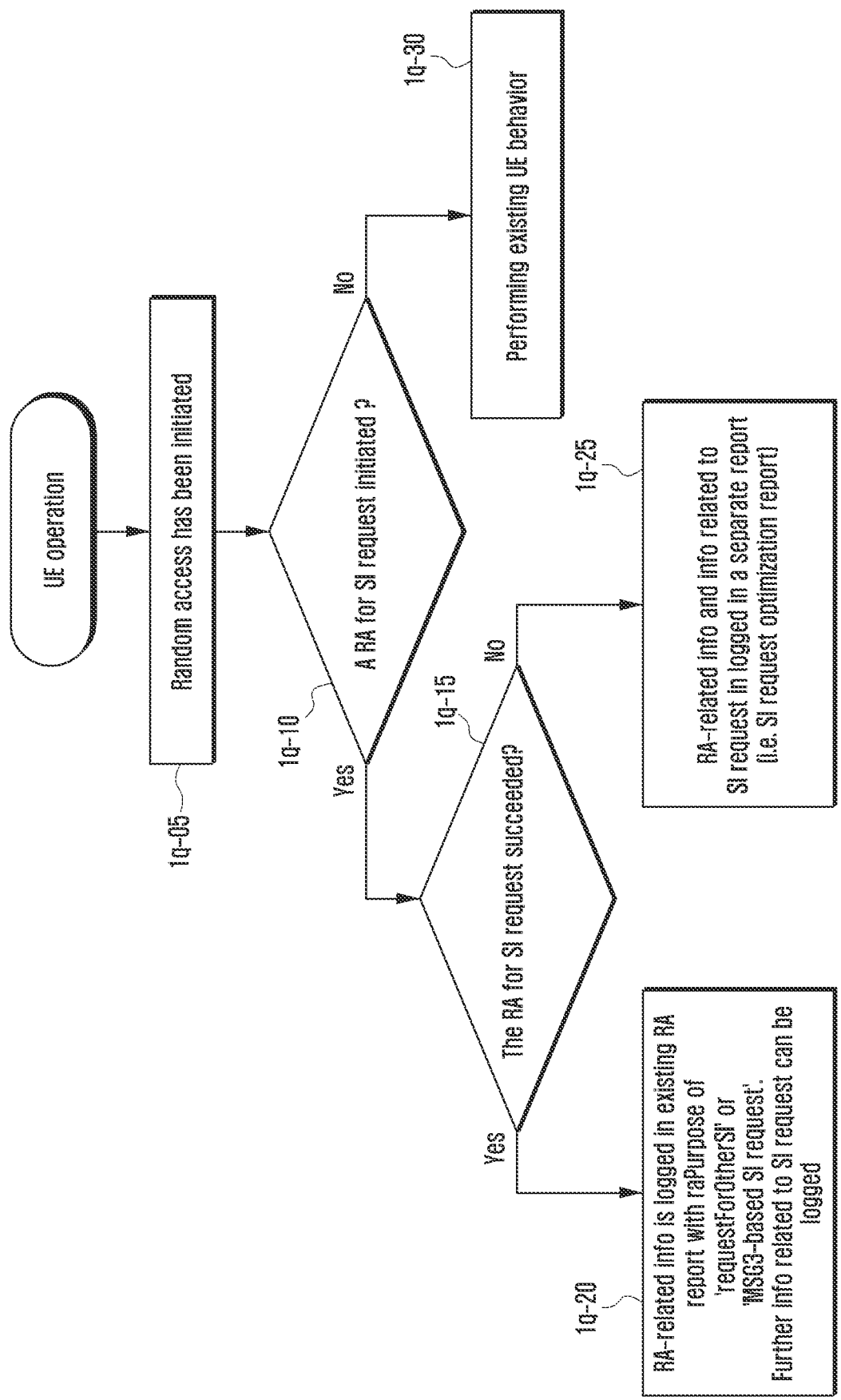
FIG. 1Q illustrates a flowchart of a terminal operation of storing SI request-related information in multiple random access reports according to an embodiment of the disclosure.

FIG. 1Q illustrates a flowchart of a terminal operation of storing SI request-related information in multiple random access reports according to an embodiment of the disclosure.

In operation 1q-05, a terminal may trigger a random access.

In operation 1q-10, the terminal may determine whether the triggered random access is for the purpose of an SI request.

In operation 1q-15, in case that the triggered random access may be for the purpose of an SI request, the terminal may determine whether the random access has been successfully completed.

In operation 1q-20, in case that the random access has been successfully completed, in the case of an msg1-based SI request or in the case of a "requestForOtherSI" or msg3-based SI request, the terminal may configure a raPurpose value in an RA report entry as a cause value indicating the msg1-based SI, requestForOtherSI, or msg3-based SI request, and store RA-related information and SI request-related information in the conventional first RA-ReportList.

In operation 1q-25, in case that the random access has not been successfully completed, in the case of an msg1-based SI request or in the case of a "requestForOtherSI" or msg3-based SI request, the terminal may configure a raPurpose value in an RA report entry as a cause value indicating the msg1-based SI, requestForOtherSI, or msg3-based SI request, and store RA-related information and SI request-related information in a second RA-ReportList.

In operation 1q-30, in case that the triggered random access is not for the purpose of an SI request, the terminal may generally store information on a successfully completed RA as an RA report content.

Figure 1R:
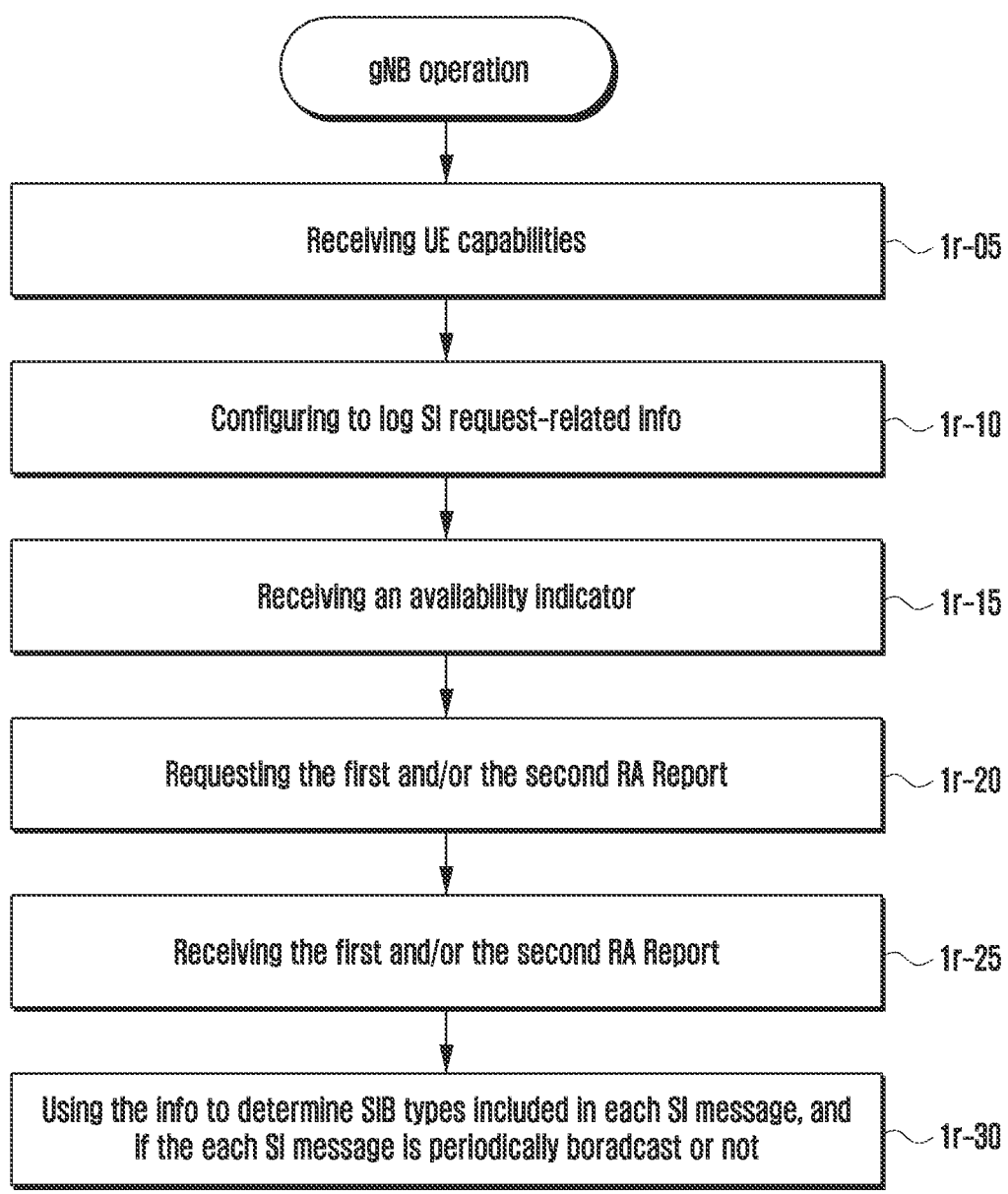
FIG. 1R illustrates a flowchart of a base station operation of storing SI request-related information in multiple random access reports according to an embodiment of the disclosure.

FIG. 1R illustrates a flowchart of a base station operation of storing SI request-related information in multiple random access reports according to an embodiment of the disclosure.

In operation 1r-05, a base station may receive terminal capability information from a terminal.

In operation 1r-10, the base station may configure, to the terminal, an operation of storing SI request-related information, by using a predetermined RRC message.

In operation 1r-15, the base station may receive an indicator indicating whether to store the SI request-related information from the terminal.

In operation 1r-20, the base station may request the terminal to report a first RA-ReportList, a second RA-ReportList, or the both lists including the SI request-related information.

In operation 1r-25, the base station may receive a report of the SI request-related information from the terminal.

In operation 1r-30, the base station may use the information to select SIB(s) configuring each SI message, and determine whether to broadcast each SI message periodically.

Figure 1S:
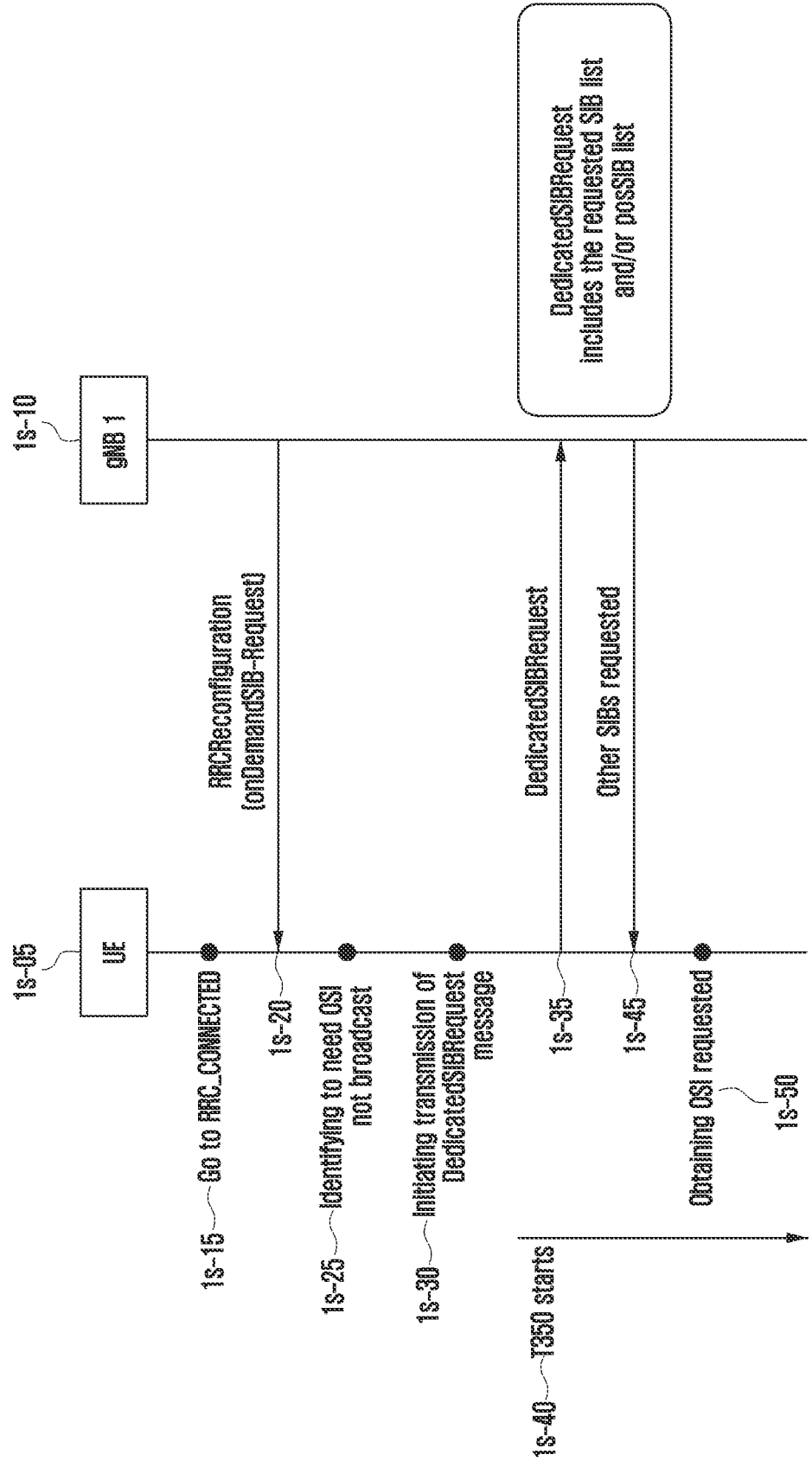
FIG. 1S illustrates an SI request process in a connected mode according to an embodiment of the disclosure.

FIG. 1S illustrates an SI request process in a connected mode according to an embodiment of the disclosure.

A terminal 1s-05 may switch to a connected mode (1s-15). A base station 1s-10 may store onDeamandSIB-Request in an RRCReconfiguration message and configure the same to the terminal such that the terminal may perform an SI request operation in the connected mode (1s-20). The terminal 1s-05 may recognize that an SIB which has not been acquired is required (1s-25). For example, the terminal 1s-05 may identify that the required SIB is not being broadcasted. The terminal 1s-05 may trigger transmission of a DedicatedSIBRequest message (1s-30). The RRC message may include lists of SIBs and PosSIBs requested by the terminal 1s-05. The terminal 1s-05 may transmit the DedicatedSIBRequest message to the base station 1s-10 (1s-35). Along with the transmission of the message, the terminal 1s-05 may drive one prohibit timer, which is T350 (1s-40). While the timer is driving, the terminal 1s-05 may not transmit the DedicatedSIBRequest message. The base station 1s-10 may transmit dedicatedSystemInformationDelivery including the requested SIB or dedicatedPosSysInfoDelivery including the requested PosSIB to the terminal 1s-05 via the RRCReconfiguration message (1s-45). The terminal 1s-05 may acquire the requested SIB or PosSIB (1s-50).

Figure 1T:
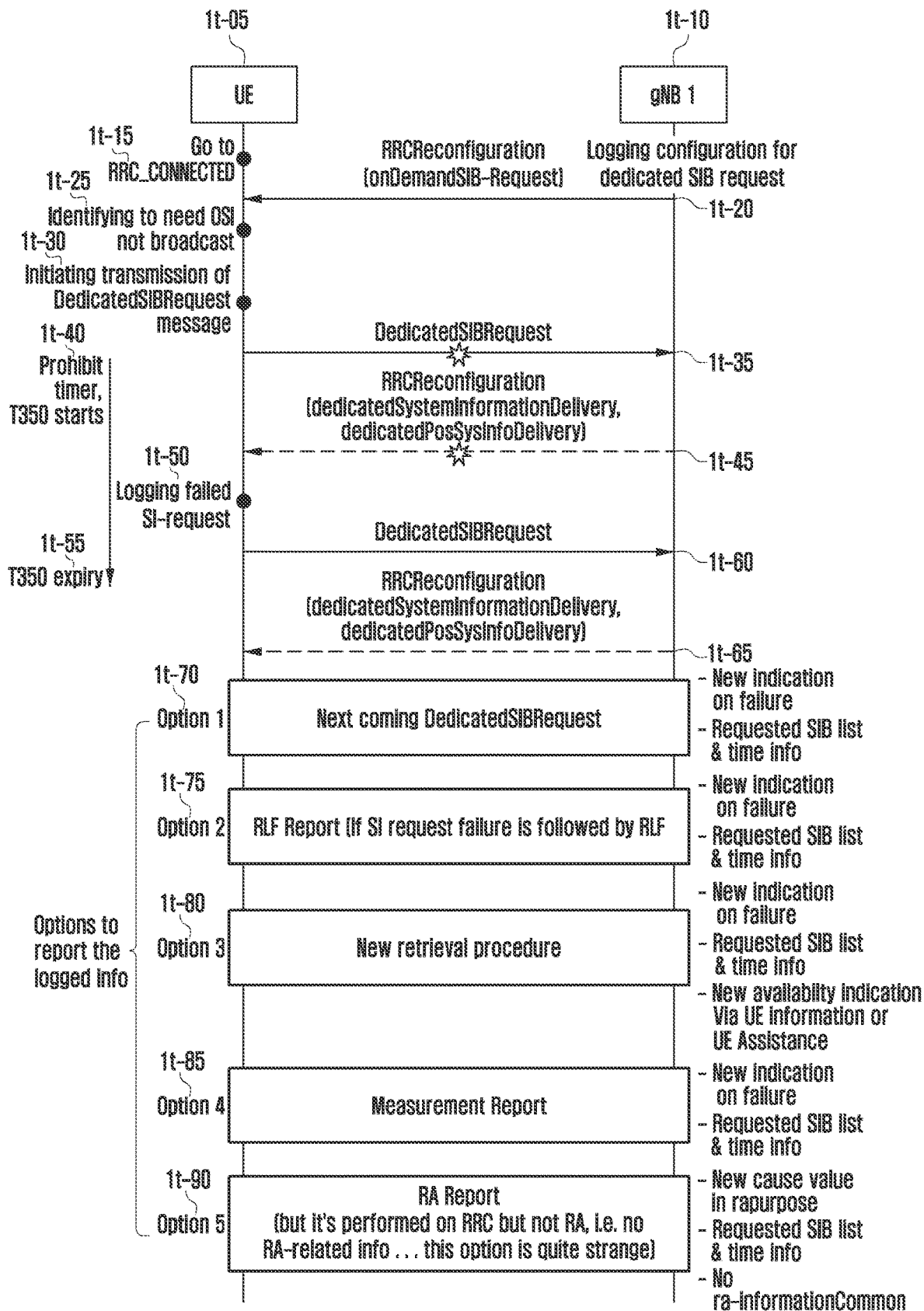
FIG. 1T illustrates a method for storing SI request-related information in a random access report in a connected mode and reporting the same according to an embodiment of the disclosure.

FIG. 1T illustrates a method for storing SI request-related information in a random access report in a connected mode and reporting the same according to an embodiment of the disclosure.

A terminal 1t-05 may switch to a connected mode (1t-15). A base station 1t-10 may configure the terminal 1t-05 to perform an SI request operation in the connected mode (1t-20). The terminal 1t-05 may recognize that an SIB which has not been broadcasted is required (1t-25). For example, the terminal 1t-05 may identify that the required SIB is not broadcasted. The terminal 1t-05 may trigger transmission of a DedicatedSIBRequest message (1t-30). The RRC message may include lists of SIBs and PosSIBs requested by the terminal 1t-05. The terminal 1t-05 may transmit the DedicatedSIBRequest message to the base station 1t-10 (1t-35). Along with the transmission of the message, the terminal 1t-05 may drive one prohibit timer, which is T350 (1t-40). In this case, the terminal 1t-05 may not be able to acquire the requested SIB or PosSIB information for a predetermined reason (1t-45). The terminal 1t-05 may store information related to the acquisition failure at a predetermined time point (1t-50). For example, the predetermined time point may be a time point when the T350 expires or a time point when radio link failure (RLF) occurs in a state in which the requested SIB or PosSIB is not received. When the T350 timer expires (1t-55), the terminal 1t-05 may re-transmit the DedicatedSIBRequest message (1t-60). The base station 1t-10 may transmit dedicatedSystemInformationDelivery including the requested SIB or dedicatedPosSysInfoDelivery including the requested PosSIB to the terminal 1t-05 via an RRCReconfiguration message, and the terminal 1t-05 may acquire the requested SIB or PosSIB (1t-65).

The terminal 1t-05 may report information related to acquisition failure of the requested SIB or PosSIB information via a predetermined method. The following method in the disclosure is proposed.

First option 1t-70: After failure, a terminal may include the failure information in the transmitted DedicatedSIBRequest message to transmit the failure information.

Second option 1t-75: A terminal may include the failure information in an RLF report. The cause of the failure may be RLF occurrence, and the RLF report may indicate that the SI request operation has been performed at a time point of the RLF occurrence.

Third option 1t-80: A terminal may include, in a predetermined RRC message, an indicator indicating that the failure information is stored, so as to report the indicator to a base station, and when the base station requests the information via a UEInformationRequest message, the terminal may transmit a UEInformationResponse message including the failure information. In another method, after a base station configures a report of the failure information to a terminal, the terminal may record the failure information and then transmit a UEAssistanceInformation message including the failure information at a predetermined time point.

Fourth option 1t-85: A terminal may include the failure information in a MeasurementReport message to transmit the failure information.

Fifth option 1t-90: Store in an RA Report entry. However, it is irrelevant to a random access since an SIB or PosSIB request in the connected mode is made via an RRC message. Therefore, without RA-related information, only information related to an SI request may be included in an RA report.

The failure information may include the following information.

An SIB or posSIB which has been requested by a terminal

An SIB or posSIB which has been requested but not broadcasted. The reported SIB information may be reported to a base station in the form of a bitmap. Each bit configuring the bitmap may correspond to an SIB, and may be used to indicate whether the SIB is requested. A bitmap indicating an SIB and a bitmap indicating a PosSIB may be separately defined. In case that all of SIBs or PosSIBs which can be requested in the connected mode has been requested, instead of the bitmap information, a 1-bit indicator indicating the same may be included.

Figure 1X:
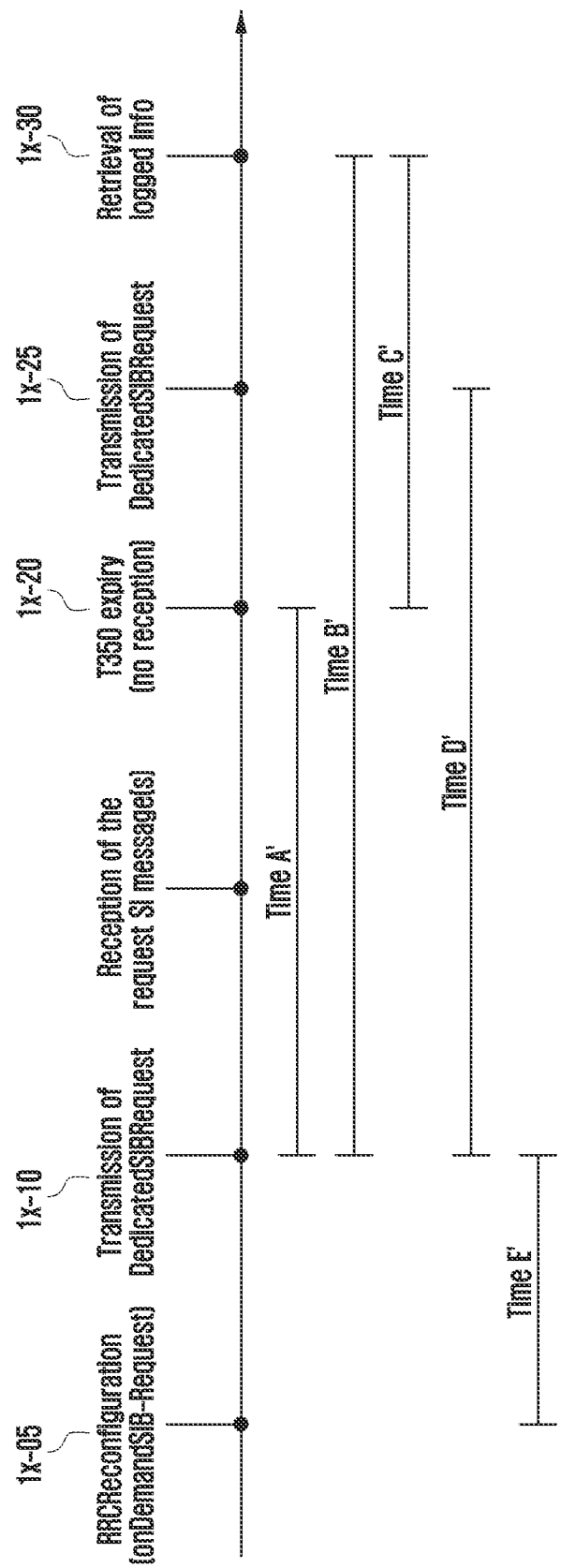
FIG. 1X illustrates time information to include SI request-related information in a connected mode according to an embodiment of the disclosure.

The number of times T350 expiration occurs in the last connected mode or in a predetermined time interval An indicator indicating that the SI request has failed Absolute time information when the SI request is triggered FIG. 1X illustrates time information to include SI request-related information in a connected mode according to an embodiment of the disclosure.

In addition to the above-mentioned information, a terminal may report new time information. In the disclosure, time information required for optimizing an SI request operation in a connected mode is proposed as follows. The start and end of each time information are as shown in Table 6 below, and the terminal may configure and store time information according to the following definition. Table 6 shows the type of time information reported when the SI request operation in the connected mode has been performed.

TABLE 6

| | Start time (for time related measurements) | End time (for time related measurements) |
|---|---|---|
| Time A' | When transmitting a DedicatedSIBRequest message (1x-10) | When a T350 timer expires (1x-20) |
| Time B' | When transmitting a DedicatedSIBRequest message (1x-10) | When reporting the stored SI request failure information (1x-30) |
| Time C' | When a T350 timer expires (1x-20) | When reporting the stored SI request failure information (1x-30) |
| Time D' | When transmitting a DedicatedSIBRequest message (1x-10) | When transmitting another DedicatedSIBRequest message (1x-25) |
| Time E' | When receiving RRCReconfiguration including onDeamandSIB-Request from a base station (1x-05) | When transmitting a DedicatedSIBRequest message (1x-10) |

Figure 1Y:
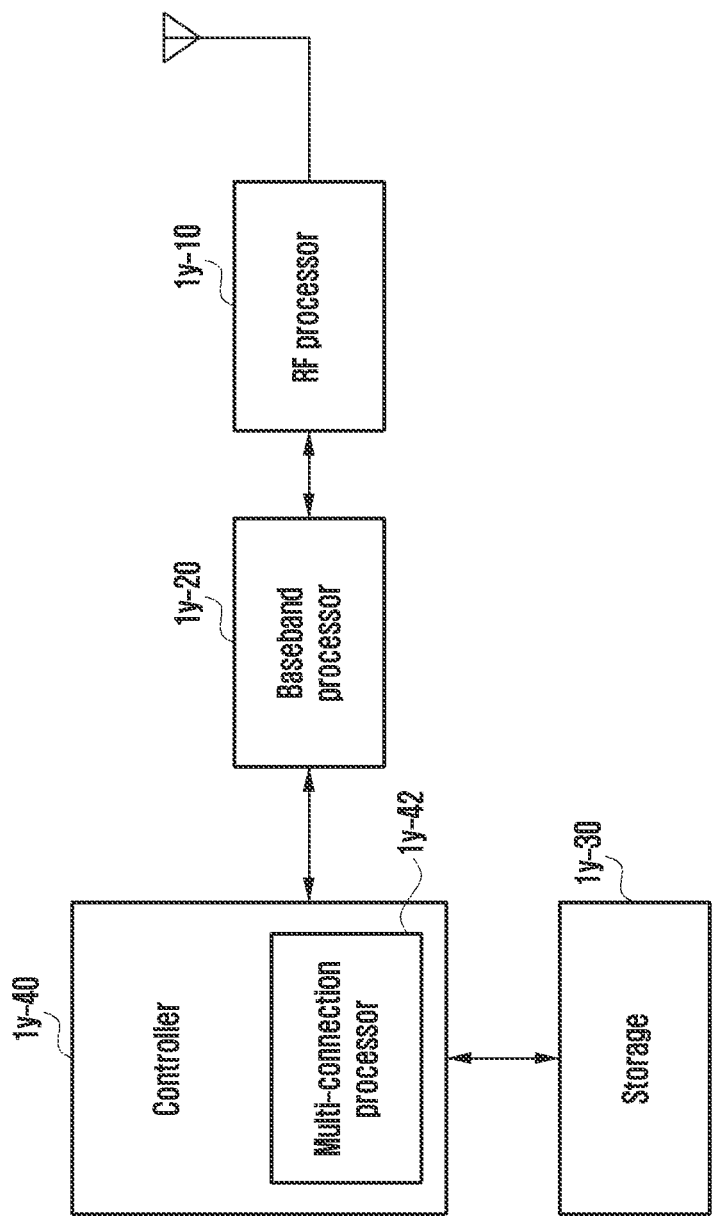
FIG. 1Y is a block diagram illustrating an internal structure of a terminal to which the disclosure is applied according to an embodiment of the disclosure.

FIG. 1Y is a block diagram illustrating a structure of a terminal according to an embodiment of the disclosure.

Referring to FIG. 1Y, the terminal may include a radio frequency (RF) processor 1y-10, a baseband processor 1y-20, a storage 1y-30, and a controller 1y-40.

The RF processor 1y-10 may perform a function of transmitting or receiving a signal via a wireless channel, such as band conversion and amplification of the signal. For example, the RF processor 1y-10 may up-convert a baseband signal provided from the baseband processor 1y-20 into an RF band signal and then transmit the RF band signal via an antenna, and down-convert the RF band signal received via the antenna into the baseband signal. For example, the RF processor 1y-10 may include a transmission filter, a reception filter, an amplifier, a mixer, an oscillator, a digital to analog convertor (DAC), an analog to digital convertor (ADC), and the like. In the drawing, only one antenna is shown, but the terminal may include a plurality of antennas. In addition, the RF processor 1y-10 may include a plurality of RF chains. Furthermore, the RF processor 1y-10 may perform beamforming. For the beamforming, the RF processor 1y-10 may adjust a phase and a size of each of signals transmitted or received via the plurality of antennas or antenna elements. In addition, the RF processor may perform MIMO, and may receive multiple layers when performing an MIMO operation.

The baseband processor 1y-20 may perform a conversion function between a baseband signal and a bit stream according to a physical layer standard of a system. For example, when data is transmitted, the baseband processor 1y-20 may generate complex symbols by encoding and modulating transmission bit streams. In addition, when data is received, the baseband processor 1y-20 may demodulate and decode a baseband signal provided from the RF processor 1y-10 to restore a reception bit stream. For example, when data is transmitted according to an orthogonal frequency division multiplexing (OFDM) scheme, the baseband processor 1y-20 may generate complex symbols by encoding and modulating transmission bit streams and map the complex symbols to sub-carriers, and then configure OFDM symbols via an inverse fast Fourier transform (IFFT) operation and a cyclic prefix (CP) insertion. In addition, when data is received, the baseband processor 1y-20 may divide a baseband signal provided from the RF processor 1y-10 into the units of OFDM symbols and restore the signals mapped to the sub-carriers via a fast Fourier transform (FFT) operation, and then restore a reception bit stream via demodulation and decoding.

The baseband processor 1y-20 and the RF processor 1y-10 may transmit and receive a signal as described above. Accordingly, the baseband processor 1y-20 and the RF processor 1y-10 may be referred to as a transmitter, a receiver, a transceiver, or a communicator. Furthermore, at least one of the baseband processor 1y-20 and the RF processor 1y-10 may include a plurality of communication modules in order to support different radio access technologies. In addition, at least one of the baseband processor 1y-20 and the RF processor 1y-10 may include different communication modules in order to process signals of different frequency bands. For example, the different radio access technologies may include a wireless local area network (LAN) (e.g., IEEE 802.11), a cellular network (e.g., LTE), and the like. In addition, the different frequency bands may include a super high frequency (SHF) (e.g., 2. NRHz and GHz) band, and a millimeter wave (e.g., 60 GHz) band.

The storage 1y-30 may store data such as a basic program, an application program, and configuration information for the operation of the terminal. In particular, the storage 1y-30 may store information related to a second access node which performs wireless communication by using a second radio access technology. In addition, the storage 1y-30 may provide stored data according to a request of the controller 1y-40.

The controller 1y-40 may control overall operations of the terminal. For example, the controller 1y-40 may transmit or receive a signal via the baseband processor 1y-20 and the RF processor 1y-10. In addition, the controller 1y-40 records and reads data on and from the storage 1y-30. To this end, the controller 1y-40 may include at least one processor (e.g., multi-connection processor 1y-42). For example, the controller 1y-40 may include a communication processor (CP) which performs a control for communication, and an application processor (AP) which controls an upper layer such as an application program.

Figure 1Z:
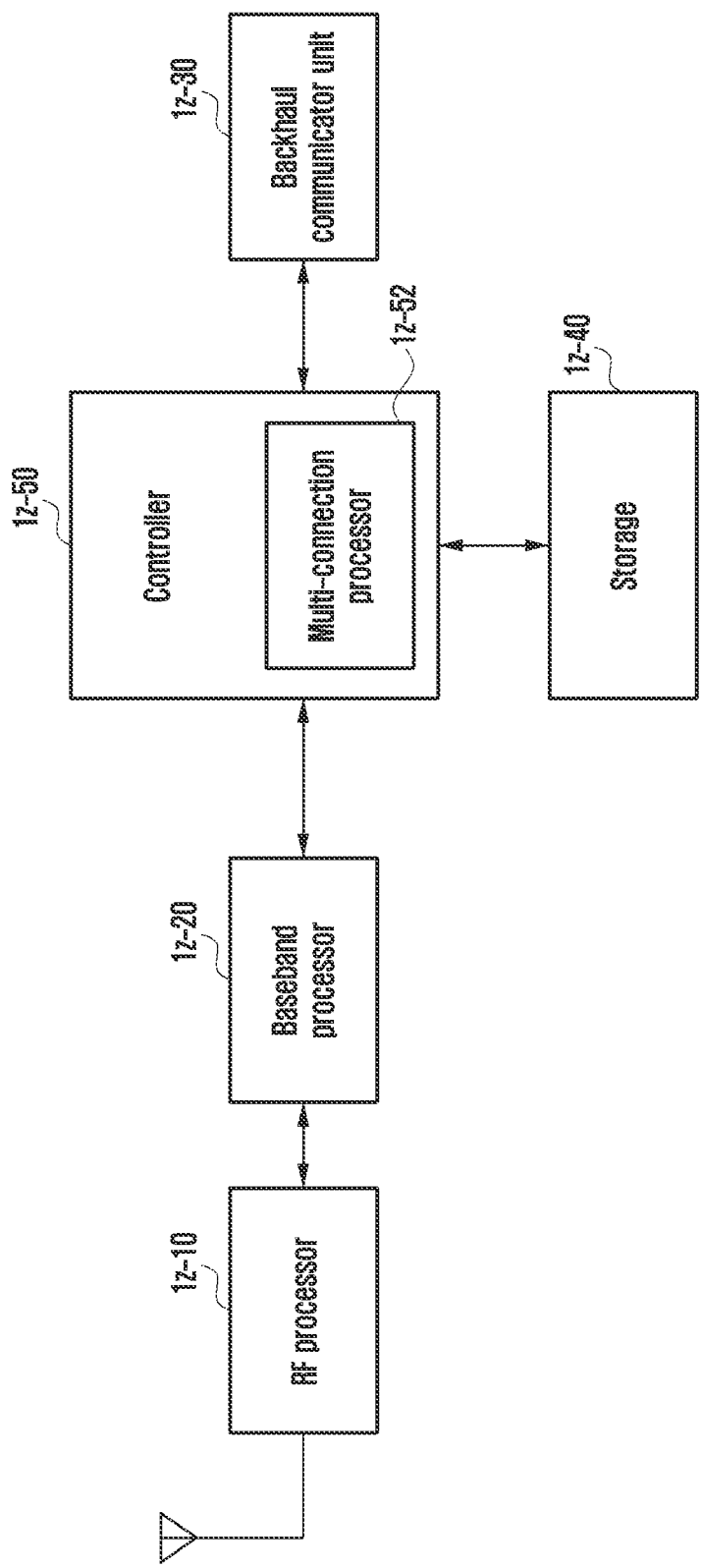
FIG. 1Z is a block diagram illustrating a configuration of a base station according to an embodiment the disclosure.

FIG. 1Z is a block diagram illustrating a configuration of a base station according to an embodiment of the disclosure.

Referring to FIG. 1Z, the base station may include an RF processor 1z-10, a baseband processor 1z-20, a backhaul communicator 1z-30, a storage 1z-40, and a controller 1z-50.

The RF processor 1z-10 may perform a function of transmitting or receiving a signal via a wireless channel, such as band conversion and amplification of the signal. That is, the RF processor 1z-10 may up-convert a baseband signal provided from the baseband processor 1z-20 into an RF band signal and then transmit the RF band signal via an antenna, and down-convert the RF band signal received via the antenna into the baseband signal. For example, the RF processor 1z-10 may include a transmission filter, a reception filter, an amplifier, a mixer, an oscillator, a DAC, an ADC, and the like. In the drawing, only one antenna is shown, but a first access node may include a plurality of antennas. In addition, the RF processor 1z-10 may include a plurality of RF chains. Furthermore, the RF processor 1z-10 may perform beamforming. For the beamforming, the RF processor 1z-10 may adjust a phase and a size of each of signals transmitted or received via the plurality of antennas or antenna elements. The RF processor may perform a downlink MIMO operation by transmitting one or more layers.

The baseband processor 1z-20 may perform a conversion function between a baseband signal and a bit stream according to a physical layer standard of a first radio access technology. For example, when data is transmitted, the baseband processor 1z-20 may generate complex symbols by encoding and modulating transmission bit streams. In addition, when data is received, the baseband processor 1z-20 may demodulate and decode a baseband signal provided from the RF processor 1z-10 to restore a reception bit stream. For example, when data is transmitted according to an OFDM scheme, the baseband processor 1z-20 may generate complex symbols by encoding and modulating transmission bit streams and map the complex symbols to sub-carriers, and then configure OFDM symbols via an IFFT operation and a CP insertion. In addition, when data is received, the baseband processor 1z-20 may divide a baseband signal provided from the RF processor 1z-10 into the units of OFDM symbols and restore the signals mapped to the sub-carriers via an FFT operation, and then restore a reception bit stream via demodulation and decoding. The baseband processor 1z-20 and the RF processor 1z-10 may transmit and receive a signal as described above. Accordingly, the baseband processor 1z-20 and the RF processor 1z-10 may be referred to as a transmitter, a receiver, a transceiver, a communicator, or a wireless communicator.

The backhaul communicator 1z-30 may provide an interface for performing communication with other nodes in the network. That is, the backhaul communicator 1z-30 may convert a bit stream transmitted from a main base station to another node, for example, an auxiliary base station, a core network, etc. into a physical signal, and convert the physical signal received from the other node into a bit stream.

The storage 1z-40 may store data such as a basic program, an application program, and configuration information for the operation of the main base station. In particular, the storage 1z-40 may store information on a bearer assigned to an accessed terminal, a measurement result reported from the accessed terminal, and the like. In addition, the storage 1z-40 may store information serving as a standard for determining whether to provide multiple connections to the terminal or stop the multiple connections. In addition, the storage 1z-40 may provide stored data according to a request of the controller 1z-50.

The controller 1z-50 may control overall operations of the main base station. For example, the controller 1z-50 may transmit or receive a signal via the baseband processor 1z-20 and the RF processor 1z-10 or via the backhaul communicator 1z-30. In addition, the controller 1z-50 records and reads data on and from the storage 1z-40. To this end, the controller 1z-50 may include at least one processor (e.g., multi-connection processor 1z-52).

According to another embodiment of the disclosure, proposed is a method for collecting SI request-related information in the above-described logged MDT operation and reporting the collected information to a base station. LoggedMeasurementConfiguration including logged MDT-related configuration information may also include configuration information required to collect SI request-related information.

In order to collect SI request-related information in the logged MDT operation, the following options may be considered.

First Option

In the first option, a new event is introduced in an event-based logged MDT. The event-based logged MDT is characterized in that when a predetermined configured event is satisfied, predetermined information is collected and recorded while the event is satisfied. The recorded information may be reported to a base station according to a retrieval operation in the existing logged MDT. In the event-based logged MDT, two conditions such as out-of-coverage and eventL1 have been introduced. The disclosure proposes a new event for collecting and recording SI request information. The new event configuration information may be included in a LoggedMeasurementConfiguration message. In this case, together with an indicator indicating the event, the following configuration information may be additionally included.

An indicator indicating whether to collect and record only msg1-based SI request-related information An indicator indicating whether to collect and record only msg3-based SI request-related information An indicator indicating whether to collect and record only information related to a successful SI request An indicator indicating whether to collect and record only information related to a failed SI request The event is satisfied when a terminal triggers an msg1-based or msg3-based SI request operation, predetermined SI request-related information may be collected and recorded until a predetermined time point (for example, until ACK feedback for the SI request is received from the base station or the reception of the requested SI is completed). In this case, the terminal may collect and record the predetermined SI request-related information once or periodically, up to the predetermined time point.

Second Option

In the second option, when a periodic or event-based logged MDT is configured, and a terminal collects and records related information, in case that an SI request operation is performed while the logged MDT operation is performed, the SI request-related information is also collected and recorded. A LoggedMeasurementConfiguration message may include a new indicator indicating whether to also collect and record SI request-related information. The terminal having received the LoggedMeasurementConfiguration message including the indicator may also collect and record the related information in case that the terminal performs the SI request operation during the logged MDT operation. In this case, together with the indicator, the following configuration information may be additionally included.

An indicator indicating whether to collect and record only msg1-based SI request-related information An indicator indicating whether to collect and record only msg3-based SI request-related information An indicator indicating whether to collect and record only information related to a successful SI request An indicator indicating whether to collect and record only information related to a failed SI request In the second option, when MDT information is recorded every logging interval, SI request-related information will also be recorded. It is satisfied when the terminal triggers an msg1-based or msg3-based SI request operation, predetermined SI request-related information may be collected and recorded until a predetermined time point, for example, until ACK feedback for the SI request is received from a base station or the reception of the requested SI is completed. In this case, the terminal may record once or periodically the predetermined SI request-related information which has been collected at a recording time point arriving according to the logging interval.

In case that, since the event is satisfied, the terminal collects and records the predetermined SI request-related information once, in the case where the SI request is successful, a time point of collecting and recording the information may be:

in the case of an msg1-based SI request, when a preamble for an SI request is transmitted and then an RAR message therefor is received, or when, according to the SI request, a corresponding SI message has been successfully received and completed, wherein the RAR message may include only RAPID corresponding to the preamble; and in the case of an msg3-based SI request, when an msg3 message including the requested SI information is transmitted and then an msg4 message corresponding to the msg3 message is received, or when, according to the SI request, a corresponding SI message has been successfully received and completed.

On the other hand, in the case where the SI request has failed, a time point of collecting and recording the information may be when a random access process triggered for the SI request is considered to have failed.

The terminal may include predetermined time information in the record. For example, absolute time information or relative time information (based on absolute time provided by LoggedMeasurementConfiguration) at a time point of collecting and recording the information absolute time information or relative time information (based on absolute time provided by LoggedMeasurementConfiguration) when a preamble is transmitted for the SI request time information until a time point when the information is recorded after a preamble is transmitted for the SI request time information until a time point when the information is recorded after an RAR message for the SI request is received time information until a time point when the information is recorded after msg3 is transmitted for the SI request time information until a time point when the information is recorded after msg4 for the SI request is received time information until a time point when the information is recorded after the requested SI message is successfully received In case that the event is satisfied, the terminal may periodically collect and record the predetermined SI request-related information until the predetermined time point. The interval of the recording period may be indicated by a loggingInterval field in LoggedMeasurementConfiguration. The loggingInterval field may be separately configured for the new event. In the case where the SI request is successful, a time point of collecting and recording the information may be:

in the case of an msg1-based SI request, a recording time point when, after a preamble for an SI request is transmitted, an RAR message therefor is received, or a recording time point when, according to the SI request, a corresponding SI message has been successfully received and completed, wherein the RAR message may include only RAPID corresponding to the preamble; and in the case of an msg3-based SI request, a recording time point when, after an msg3 message including the requested SI information is transmitted, an msg4 message corresponding to the msg3 message is received, or a recording time point when, according to the SI request, a corresponding SI message has been successfully received and completed.

In another method, at each recording time point that arrives after each stage of a random access process triggered for an SI request, for example, preamble transmission, RAR reception, msg3 transmission, and msg4 reception, and every recording time point arriving after the reception of the requested SI is completed, an indicator and information related to each of the above stages may be recorded.

On the other hand, in the case where the SI request has failed, a time point of collecting and recording the information may be a recording time point that arrives after the random access process triggered for the SI request is considered to have failed.

At each recording time point that arrives after each stage of a random access process triggered for an additionally progressed SI request, for example, preamble transmission, RAR reception, and msg3 transmission, an indicator and information related to each of the above stages may be recorded.

Figure 2A:
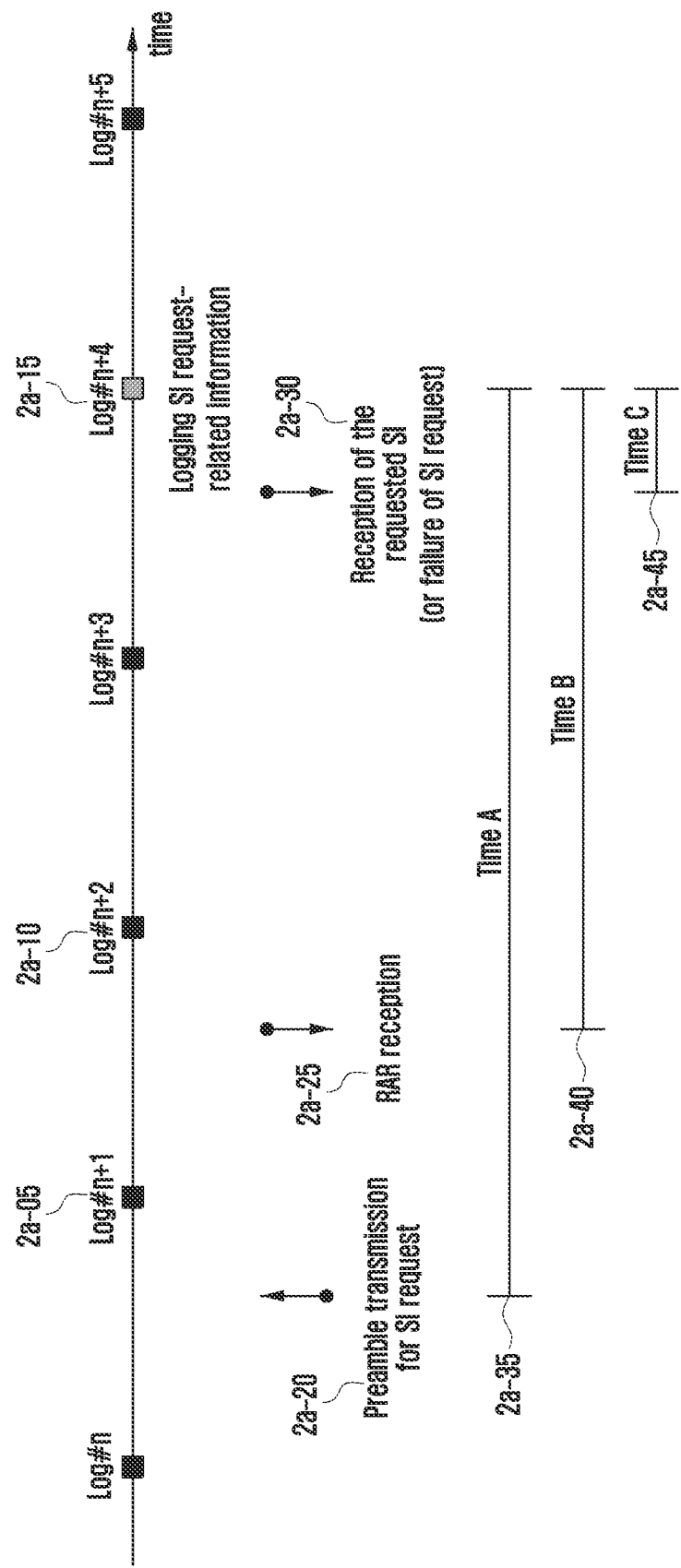
FIG. 2A illustrates an operation of collecting msg1-based SI request-related information together with a logged minimization of drive test (MDT) operation according to an embodiment of the disclosure.

The terminal may include predetermined time information in the record. For example, at each recording time point, corresponding relative time information (based on absolute time provided by LoggedMeasurementConfiguration)

time information until a recording time point that arrives after a preamble is transmitted for the SI request time information until a recording time point that arrives after an RAR message for the SI request is received time information until a recording time point that arrives after msg3 is transmitted for the SI request time information until a recording time point that arrives after msg4 for the SI request is received time information until a recording time point that arrives after the requested SI message is successfully received FIG. 2A illustrates an operation of collecting msg1-based SI request-related information together with a logged MDT operation according to an embodiment of the disclosure.

When loggingInterval is configured, periodic recording time points 2a-05, 2a-10, and 2a-15 arrive. A terminal performing an SI request operation transmits a preamble (2a-20), receives an RAR (2a-25), and completes the reception of the requested SI (2a-30), at predetermined time points.

After transmitting the preamble (2a-20), the terminal may record an indicator indicating the transmission and predetermined related information at the arriving recording time point 2a-05. Similarly, after receiving the RAR (2a-25), the terminal may record an indicator indicating the reception and predetermined related information at the arriving recording time point 2a-10, and after successfully receiving the requested SI (2a-30), the terminal may record an indicator indicating the reception and predetermined related information at the arriving recording time point 2a-15.

In another method, the terminal may record the SI request-related information only at a time point of receiving an RAR (or a recording time point that arrives after the RAR is received) or a time point of successfully receiving the requested SI (or a recording time point that arrives after the requested SI is successfully received). In this case, after each of the stages, time information 2a-35, 2a-40, and 2a-45 until a recording time point may be stored at the time point.

Figure 2B:
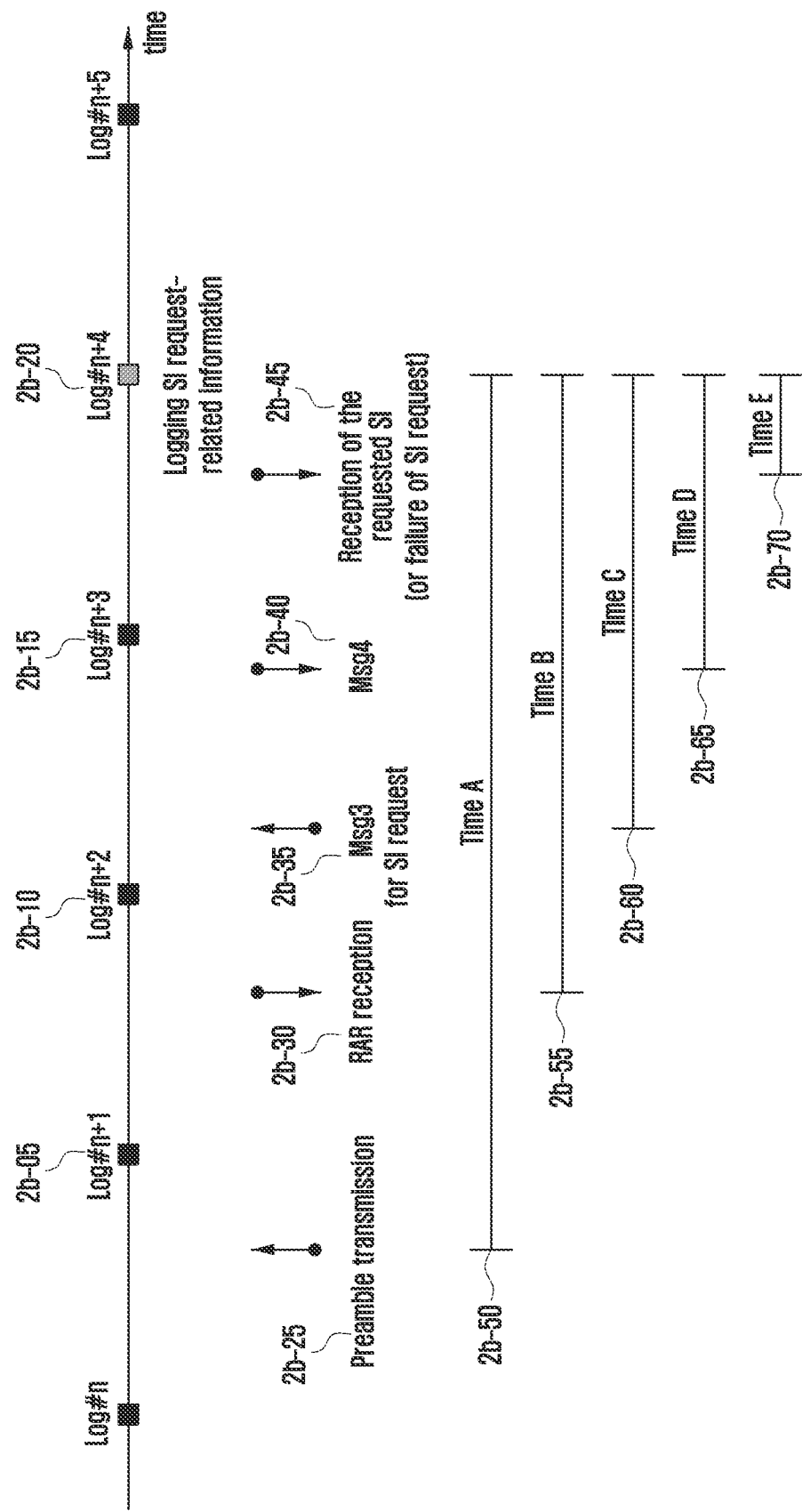
FIG. 2B illustrates an operation of collecting msg3-based SI request-related information together with a logged MDT operation according to an embodiment of the disclosure.

FIG. 2B illustrates an operation of collecting msg3-based SI request-related information together with a logged MDT operation according to an embodiment of the disclosure.

When loggingInterval is configured, periodic recording time points 2b-05, 2b-10, 2b-15, and 2b-20 may arrive. A terminal performing an SI request operation may, at predetermined time points, transmit a preamble (2b-25), receive an RAR (2b-30), transmit msg3 including requested SI information (2b-35), receive msg4 (2b-40), and complete reception of the requested SI (2b-45).

After transmitting the preamble (2b-25), the terminal may record an indicator indicating the transmission and predetermined related information at the arriving recording time point 2b-05. Similarly, after receiving the RAR (2b-30), the terminal may record an indicator indicating the reception and predetermined related information at the arriving recording time point 2b-10, after transmitting the msg3 (2b-35) and receiving the msg4 (2b-40), the terminal may record an indicator indicating the reception and predetermined related information at the arriving recording time point 2b-15, and after successfully receiving the requested SI (2b-45), the terminal may record an indicator indicating the reception and predetermined related information at the arriving recording time point 2b-20.

In another method, the terminal may record the SI request-related information only at a time point of receiving msg4 (or a recording time point that arrives after the msg4 is received) or a time point of successfully receiving the requested SI (or a recording time point that arrives after the requested SI is successfully received). In this case, after each of the stages, time information 2b-50, 2b-55, 2b-60, 2b-65, and 2b-70 until a recording time point may be stored at the time point.

A terminal records the following information related to a successful or failed SI request in a logged MDT.

SIB list information requested by the terminal

An indicator indicating whether an SI request operation is an msg1-based or msg3-based request operation An indicator indicating whether an SI request operation has succeeded or failed. The success or failure of the SI request operation may be determined based on whether the terminal has successfully received the requested SIB or an SI message including the SIB, or whether the terminal has received ACK feedback from a base station according to the SI request. For example, in the msg1-based SI request, when an RAR message including the corresponding RAPID is received, and in the msg3-based SI request, when an msg4 message corresponding to msg3 including an SI request message is received, the SI request operation may be determined to be successful.

Information related to a random access triggered for an SI request. As an example, RA-InformationCommon IE may be reused.

As the terminal reselects a cell, an SI request operation in progress may be stopped or a new SI request operation may be triggered. In this case, it may be difficult to consider the SI request which has been previously in progress as success or failure. In order to deal with the difficulty, one of the following methods may be considered.

The SI request may be considered to be successful when the terminal reselects a cell during the SI request, when the terminal receives even an RAR message including the corresponding RAPID in the msg1-based SI request operation which has been in progress, or when the terminal receives even an msg4 message corresponding to msg3 including an SI request message in the msg3-based SI request operation which has been in progress. Otherwise, the SI request may be considered to have failed.

When the terminal reselects a cell during the SI request, an explicit indicator indicating the reselection may be recorded together.

When the terminal reselects a cell during the SI request, information related to the SI request operation which has been in progress is not recorded.

An RA report may be used to report information related to a successfully completed SI request operation, and a connection establishment failure report (CEF report) may be used to report information related to a failed SI request operation. A CEF report operation is an operation of, when a terminal in an idle mode or an inactive mode has attempted to switch to a connected mode but failed, collecting and reporting related information at the time of failure. A CEF report content may be set when a setup or resume operation is triggered and when a T300 or T319 timer which is driven expires. On the other hand, when the terminal triggers an SI request operation, the CEF report content may be set at a time point when a random access triggered for the SI request is considered to have failed. The random access is considered to have failed when a random access process is not successfully completed even when the configured maximum number of retries has been exceeded, and specific failure recognition may follow standard document TS38.321.

The CEF report includes serving cell and neighboring cell measurement information, random access-related information, and the number of consecutive failures (numberOfConnFail field) of connected mode switching in a recent cell, and the like. According to standard document TS38.331, the numberOfConnFail field may be defined as shown in Table 7 below.

TABLE 7 number OfConnFail

This field is used to indicate the latest number of consecutive failed RRCSetup or RRCResume procedures in the same cell independent of RRC state transition.

In the disclosure, the following information related to a failed SI request operation may be included in a CEF report.

An indicator indicating that the CEF report is set by SI request failure

A list of indicators indicating that each failure is an SI request failure, when the number of consecutive failures (numberOfConnFail field) in a recent cell is included. The size of the list is the same as the number of failures, and the order of each indicator in the list may correspond to the failure order.

A list of indicators indicating that each failure is a msg1-based or msg3-based SI request failure, when the number of consecutive failures (numberOfConnFail field) in a recent cell is included. The size of the list is the same as the number of failures, and the order of each indicator in the list may correspond to the failure order.

In another method, when an SI request fails, a value of the numberOfConnFail field may not be increased by one. Alternatively, a separate numberOfConnFail field corresponding to SI request failure may be defined.

In addition, multiple pieces of time information related to an SI request operation may be included.

Figure 2C:
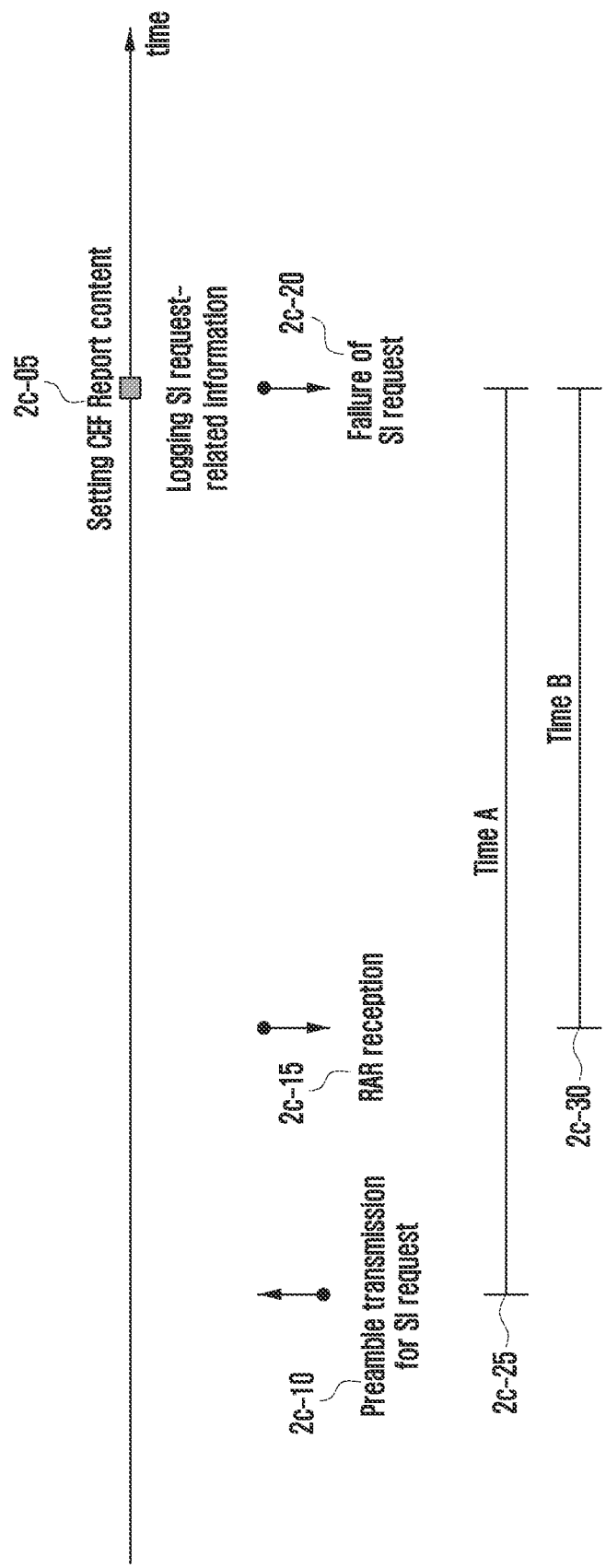
FIG. 2C illustrates an operation of collecting msg1-based SI request-related information together with a connection establishment failure (CEF) report operation according to an embodiment of the disclosure.

FIG. 2C illustrates an operation of collecting msg1-based SI request-related information together with a CEF report operation according to an embodiment of the disclosure.

Time information 2c-25 or 2c-30 from a time point when a preamble is transmitted for an SI request (2c-10), when an RAR is received, or when requested SI is successfully received (2c-15) until the SI request-related information is recorded may be recorded at a time point 2c-20 when a random access process triggered for the SI request is considered to have failed (2c-05).

Figure 2D:
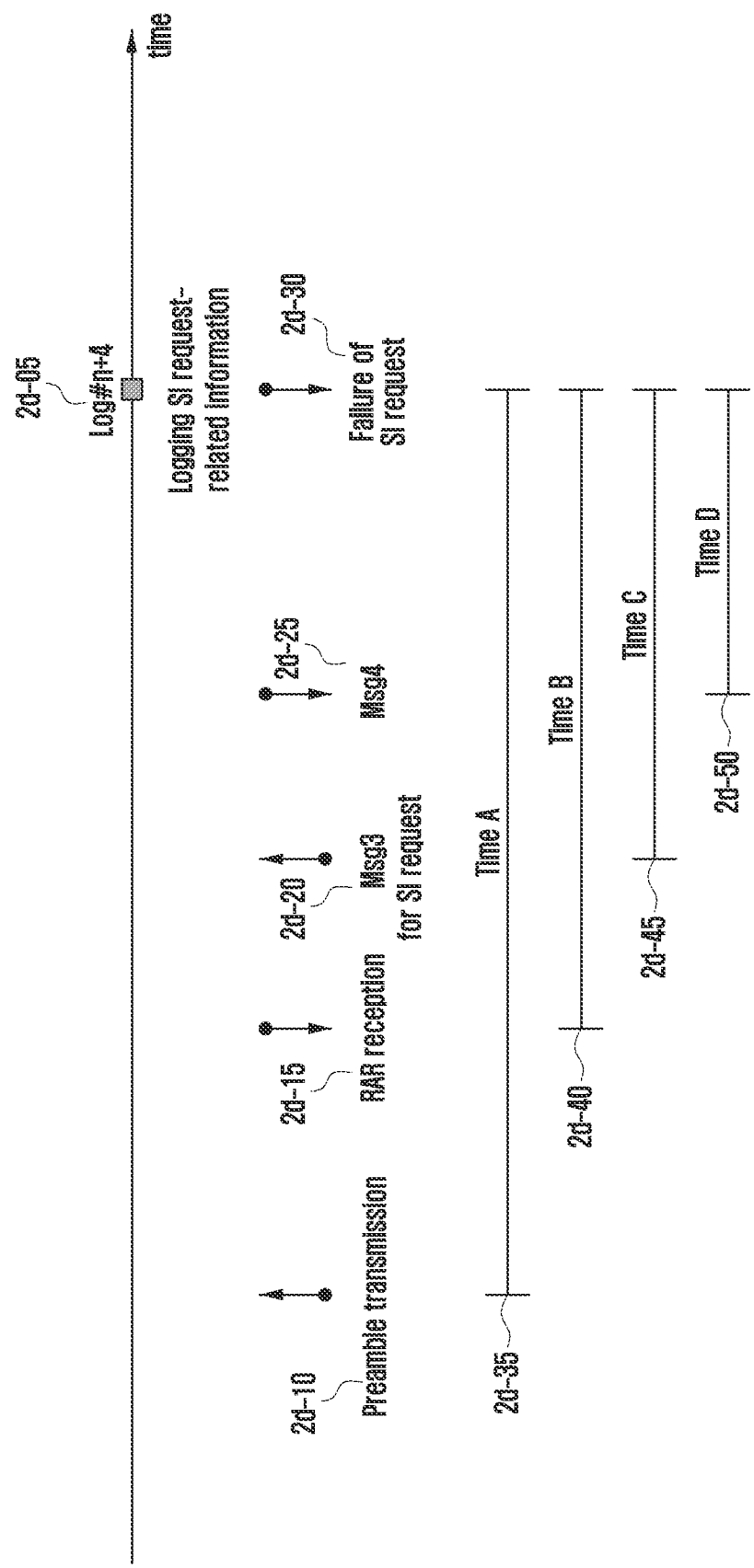
FIG. 2D illustrates an operation of collecting msg3-based SI request-related information together with a CEF report operation according to an embodiment of the disclosure.

FIG. 2D illustrates an operation of collecting msg3-based SI request-related information together with a CEF report operation according to an embodiment of the disclosure.

Time information 2d-35, 2d-40, 2d-45, or 2d-50 from a time point when a preamble is transmitted for an SI request (2d-10), when an RAR is received, when requested SI is successfully received (2d-15), when msg3 is transmitted (2d-20), or when msg4 is received (2d-25) until the SI request-related information is recorded may be recorded at a time point 2d-30 when a random access process triggered for the SI request is considered to have failed (2d-05).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   identifying that a random access (RA) procedure is successfully completed or failed;
   setting, based on the identification, first information indicating which system information block has been requested by the terminal to receive during the RA procedure;
   setting second information indicating whether an on-demand system information acquisition is successful; and
   generating a first message including at least one RA report information, based on the first information and the second information,
   wherein the at least one RA report information further includes third information on a positioning system information block has been requested by the terminal to receive during the RA procedure, fourth information indicating whether a system information block has been requested in an normal uplink (NUL) or supplementary uplink (SUL), and fifth information indicating whether a requested system information block is an area-based system information block.

2. The method of claim 1, wherein the second information indicates that the on-demand system information acquisition is not successful, in case that an on-demand system information request is failed.

3. The method of claim 1, wherein the first message includes the second information indicating that the on-demand system information acquisition is not successful, or indicating that the on-demand system information acquisition is successful.

4. A terminal in a wireless communication system, the terminal comprising:
a transceiver; and
at least one processor coupled to the transceiver and configured to:
identify that a random access (RA) procedure is successfully completed or failed,
set, based on the identification, first information indicating which system information block has been requested by the terminal to receive during the RA procedure,
set second information indicating whether an on-demand system information acquisition is successful, and
generate a first message including at least one RA report information, based on the first information and the second information,
wherein the at least one RA report information further includes third information on a positioning system information block has been requested by the terminal to receive during the RA procedure, fourth information indicating whether a system information block has been requested in an normal uplink (NUL) or supplementary uplink (SUL), and fifth information indicating whether a requested system information block is an area-based system information block.

5. The terminal of claim 4, wherein the second information indicates that the on-demand system information acquisition is not successful, in case that an on-demand system information request is failed.

6. The terminal of claim 4, wherein the first message includes the second information indicating that the on-demand system information acquisition is not successful, or indicating that the on-demand system information acquisition is successful.

7. A method performed by a base station in a wireless communication system, the method comprising:
transmitting, to a terminal, a first message including first information requesting to report at least one information associated with a random access (RA) procedure; and
receiving, from the terminal, a second message including at least one RA report information, based on the first information,
wherein second information indicating which system information block has been requested by the terminal during the RA procedure to receive is set, by the terminal, in case that the RA procedure is successfully completed or failed,
wherein third information indicating whether an on-demand system information acquisition is successful is set by the terminal,
wherein the second message includes the at least one RA report information, based on the second information and the third information, and
wherein the at least one RA report information further includes fourth information on a positioning system information block has been requested by the terminal to receive during the RA procedure, fifth information indicating whether a system information block has been requested in an normal uplink (NUL) or supplementary uplink (SUL), and sixth information indicating whether a requested system information block is an area-based system information block.

8. The method of claim 7, wherein the third information indicates that the on-demand system information acquisition is not successful, in case that an on-demand system information request is failed.

9. The method of claim 7, wherein the second message includes the third information indicating that the on-demand system information acquisition is not successful, or indicating that the on-demand system information acquisition is successful.

10. A base station in a wireless communication system, the base station comprising:
a transceiver; and
at least one processor coupled to the transceiver and configured to:
transmit, to a terminal via the transceiver, a first message including first information requesting to report at least one information associated with a random access (RA) procedure, and
receive, from the terminal via the transceiver, a second message including at least one RA report information, based on the first information,
wherein second information indicating which system information block has been requested by the terminal during the RA procedure to receive is set, by the terminal, in case that the RA procedure is successfully completed or failed,
wherein third information indicating whether an on-demand system information acquisition is successful is set by the terminal,
wherein the second message includes the at least one RA report information, based on the second information and the third information, and
wherein the at least one RA report information further includes fourth information on a positioning system information block has been requested by the terminal to receive during the RA procedure, fifth information indicating whether a system information block has been requested in an normal uplink (NUL) or supplementary uplink (SUL), and sixth information indicating whether a requested system information block is an area-based system information block.

11. The base station of claim 10, wherein the third information indicates that the on-demand system information acquisition is not successful, in case that an on-demand system information request is failed.

12. The base station of claim 10, wherein the second message includes the third information indicating that the on-demand system information acquisition is not successful, or indicating that the on-demand system information acquisition is successful.

* * * * *